United States Patent
Boerries et al.

(10) Patent No.: US 8,032,510 B2
(45) Date of Patent: Oct. 4, 2011

(54) SOCIAL ASPECTS OF CONTENT AGGREGATION, SYNDICATION, SHARING, AND UPDATING

(75) Inventors: Marco Boerries, Los Altos Hills, CA (US); Keith Saft, San Francisco, CA (US); George Grinsted, Stockholm (SE); Lee Parry, London (GB); Carlo P. Bernoulli, Berlin (DE); Marc Davis, San Francisco, CA (US); Joseph O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 437 days.

(21) Appl. No.: 12/182,756

(22) Filed: Jul. 30, 2008

(65) Prior Publication Data

US 2009/0222488 A1  Sep. 3, 2009

Related U.S. Application Data

(60) Provisional application No. 61/068,086, filed on Mar. 3, 2008.

(51) Int. Cl.
*G06F 17/30* (2006.01)
*G06F 7/00* (2006.01)

(52) U.S. Cl. ........................ 707/709; 707/780

(58) Field of Classification Search .................. 707/709, 707/780
See application file for complete search history.

(56) References Cited

U.S. PATENT DOCUMENTS

| 6,324,566 | B1 * | 11/2001 | Himmel et al. ............... 709/203 |
| 7,167,901 | B1 * | 1/2007 | Beadle et al. .................. 709/207 |
| 2004/0139092 | A1 * | 7/2004 | Jones et al. ................... 707/100 |
| 2006/0123335 | A1 | 6/2006 | Sanchez et al. | |
| 2007/0157119 | A1 | 7/2007 | Bishop | |
| 2008/0028295 | A1 | 1/2008 | Nazem et al. | |

FOREIGN PATENT DOCUMENTS

| KR | 2001-0016187 | 3/2001 |
| KR | 2004-0012660 | 2/2004 |

OTHER PUBLICATIONS

U.S. Appl. No. 11/651,102, filed Jan. 5, 2007, Ott.
U.S. Appl. No. 12/069,731, filed Feb. 11, 2008, Marlow.
Notification of Transmittal of the International Search Report and The Writing Opinion of the International Searching Authority dated Aug. 28, 2009 from PCT Application No. PCT/US2009/035020.

* cited by examiner

*Primary Examiner* — Kuen Lu
(74) *Attorney, Agent, or Firm* — Weaver Austin Villeneuve and Sampson LLP

(57) ABSTRACT

"Smart bookmarks" are described which facilitate aggregation, sharing, and dynamic access to the content in which a particular user has an interest.

13 Claims, 37 Drawing Sheets

1002 — onePlace™ 12:45 pm
- Trip to Hamburg
- ⊕ Add to this Collection
- ◇ Local businesses
  - Gaststatte Vienna — 040 439 91 82
  - Le Royal Meridian — 040 2100-0
  - Raun 73 — 040 439 91 56 ☆1
  - Their — 040 439 91 82
- ◇ Music
  - Die Fantastischen Vier — Event: 2 March 08, 8pm ☆4
- ◇ Places
  - Altona, Hamburg Germany — Cloudy 10°C Category sort
- Categories are A to Z
- Bookmarks are grouped by type (without labels) and then A-Z within the group

1004 — onePlace™ 12:45 pm
- Trip to Hamburg
- ⊕ Add to this Collection
- ◇ What's new
  - Die Fantastischen Vier — Event: 2 March 08, 8pm ☆4
  - Raun 73 — 040 439 91 56 ☆1
- ◇ No updates
  - Altona, Hamburg Germany — Cloudy 10°C
  - Their — 040 439 91 82
  - Gaststatte Vienna — 040 439 91 82
  - Le Royal Meridian — 040 2100-0

Relivance sort
- New vitality first
- followed by Date added

1006 — onePlace™ 12:45 pm
- Trip to Hamburg
- ⊕ Add to this Collection
- Altona, Hamburg Germany — Cloudy 10°C
- Die Fantastischen Vier — Event: 2 March 08, 8pm ☆4
- Gaststatte Vienna — 040 439 91 82
- Le Royal Meridian — 040 2100-0
- Raun 73 — 040 439 91 56 ☆1
- Their — 040 439 91 82

A-Z sort
- Alphabetically by Bookmark name

Answers (2 of 16)
- Will Shilling return to the line up for the homestand?
- Who's the best looking Outfielder?

Ask a Question......
More Answers >

Yahoo! Groups Updates (2 of 23)
"I would have pulled Dice K in the fifth inning. How does a manager..."
Red_Sox_Nation
"If New York takes this series..."
Die-Hard_Sox
More Groups Updates >

More Style
- Red Sox Ringtones
- Red Sox Shopping
- Red Sox Online
- Red Sox Schedule
- Share this Page Its fast, its free

Callout box:
1. Sponsorship/Display Ad
2. Video Player sponsorship, Video Ads
3. Contest Sponsorship
4. Limited edition gifts, (i.e., micropayments)
5. Infinity Ads, Search Results
6. Ringtones, Search Results

1306

StyleMap (1 of 16)
Same Adams Game Ritual Contest
More Maps >
Create a Map >
My Saved Maps >

Limited Edition StyleGifts
Gift it to friend >

Flickr Photos (3 of 128)
More Flick >

Red Sox Offers
Offers Near You
1. Pre-Game Happy Hour at the Cask
2. Save $5 on Game Day Parking
Online Offers
1. JetBlue Deals from Boston

1304

StyleTalk (2 of 14)
- We are going to the World Series this Year!
- I have extra tickets for....

More StyleTalk >
Add to the Talk >

My Red Sox People (6 of 8)
Start a Group Chat >
More People >

My Red Sox "Haters"
Send Some Smack Talk >

Red Sox People (6 of 45)
More People >

People Quiz
Guess who likes Sam Adams?
Results >
Send to Friend >

1302

Boston Red Sox
Red Sox
o Red Sox ousts Indians

Add this Style to My Profile

Scoreboard
Today
Boston 3    8
New York 1
Today
More Scores >

News Photos (3 of 15)
More News >

News Articles (2 of 32)
Red Sox ousts Indians 14-9
Schilling throws warms up
More News >

Red Sox TV

View news items

2902 onePlace™ — 12:45 pm

Sports — ⊕ Add more sports!

Scoreboard
- HSV Hamburg 4 - 1 Frankfurt
  Mar 2, 2008 21:51 GMT+1
- L.A. Lakers 106
  vs. Miami Heat 88
- Arsenal - West Ham
  Mar 5, 2008 20:00 GMT

My teams
- HSV Hamburg
- Arsenal
- SF 49ers
- L.A. Lakers

More teams ⊙

My leagues
- Bundesliga
- Premier League
- National Football League
- National Basketball Association More leagues ⊙

My players
- David Beckham
- Kobe Bryant
- Jens Lehmann

More players ⊙

My Collections
- March maddness
- Favorite pics
- ⊕ Add more

Options    Select    Back
Open Sports

2904 onePlace™ — 12:45 pm

HSV Hamburg Scores & Schedule ◁1⃣3⃣▷

Team standing: 3rd rank

Last 5 games
| | | |
|---|---|---|
| Mar 2 | Frankfurt | 4 - 1 |
| Feb 24 | Bayern Muchen | 1 - 1 |
| Feb 17 | VFL Bochum | 0 - 3 |
| Feb 9 | Bayer Leverkusen | 1 - 1 |
| Feb 2 | Hannover 96 | 1 - 1 |

More scores ⊙

Next 5 games
| | | |
|---|---|---|
| Mar 9 | 1.FC Nurnberg | 17:00 |
| Mar 15 | Borussia Dortmund | 15:30 |
| Mar 22 | VFL Wolfsburg | 15:30 |
| Mar 29 | Arminia Bielefeld | 15:30 |
| Apr 4 | VFB Stuttgart | 15:30 |

More games ⊙

Show....
- Scores & Schedules
- News
- Roster
- Details

Options    Select    Back
Open Sports Team

FIG. 30

— 3002 onePlace™ 12:45 pm
HSV Hamburg ◁1|3▷
News

Last updated: 5 min. ago

Van Basten hints at Hamburg interest

Bundesliga - Atouba goes awol

Frankfurt in Hamburg in round 22

HSV crash out of the DFB Cup in Wolfsburg

Show....
Scores & Schedules
News
Roster
Details

Options    Select    Back

Sports Team page 2

— 3004 onePlace™ 12:45 pm
HSV Hamburg ◁1|3▷
News

| No. | Player | Pos. |
|---|---|---|
| 1 | Frank Rost | Goal |
| 3 | Thimothee Atouba | Def. |
| 19 | Jerome Boateng | Def. |
| 4 | Bastian Reinhardt | Def. |
| 8 | Nigel de Jong | Mid. |
| 14 | David Jarolim | Mid. |
| 15 | Piotr Trochowski | Mid. |
| 23 | Rafael van der Vaart | Mid. |
| 9 | Paolo Guerrero | Forw. |
| 7 | Mohamed Zidan | Forw. |
| 11 | Ivica Olic | Forw. |

Show....
Scores & Schedules
News
Roster
Details

Options    Select    Back

Sports Team page 3

— 3006 onePlace™ 12:45 pm
HSV Hamburg ◁1|3▷
Bookmarks & Notes

Related bookmarks
🌐 www.hsv.de
☐ Hamburg Return To Third With Emphatic Win
🌐 ...

See Also
◆ HSV Hamburg

My Notes
⊕ Add note

Options    Select    Back

Sports Team page 4

Open article from pulse

FIG. 34

SOCIAL ASPECTS OF CONTENT AGGREGATION, SYNDICATION, SHARING, AND UPDATING

RELATED APPLICATION DATA

The present application claims priority under 35 U.S.C. 119(e) to U.S. Provisional Patent Application No. 61/068,086 entitled ONEPLACE CONTENT AGGREGATION, SYNDICATION, SHARING, AND UPDATING filed on Mar. 3, 2008, the entire disclosure of which is incorporated herein by reference for all purposes.

The present application is also related to U.S. patent application Ser. No. 12/182,715 entitled MECHANISMS FOR CONTENT AGGREGATION, SYNDICATION, SHARING, AND UPDATING filed on the same day as the present application, the entire disclosure of which is incorporated herein by reference for all purposes.

BACKGROUND OF THE INVENTION

The present invention relates to techniques for managing content in networks and, more specifically to techniques by which users can aggregate and manage content of interest.

Users of the Internet and the World Wide Web consume content in a wide variety of forms from a seemingly infinite variety of sources. One type of mechanism by which a user can return to a web site or locate a content resource is the bookmarks or favorites functionality provided by the typical web browser. Using such mechanisms, users can periodically check on the sites and content in which they have an interest to see whether anything new and interesting has been posted. Another type of mechanism provides updates to the user regarding recent developments such as, for example, the publication of new content, e.g., RSS feeds.

Despite the usefulness of such tools, given the sheer volume of content in which the typical user has an interest, the dynamic nature of the content, and the disparate nature of the sources of content, current tools for accessing and consuming content are becoming increasingly inadequate.

SUMMARY OF THE INVENTION

According to the present invention, "smart bookmarks" are described which facilitate aggregation, sharing, and dynamic access to the content in which a particular user has an interest. According to various embodiments, methods and apparatus are provided for providing access to content. Presentation of a smart bookmark in a user interface is facilitated. The smart bookmark includes a plurality of entries relating to a particular concept. Each entry conveys current information regarding the particular concept and includes an object representing remotely stored content relating to the particular concept. The object is configured to facilitate access to the corresponding remotely stored content. At least some of the entries relate to contextual metadata associated with a user associated with the user interface.

According to specific embodiments, at least one computer-readable medium is provided having data structures stored therein which include smart bookmark configuration information. The smart bookmark configuration information is configured to enable instantiation of a smart bookmark.

According to other embodiments, methods and apparatus are provided for providing access to content. Smart bookmark configuration information is stored for a plurality of smart bookmarks. In response to a request corresponding to a first one of the plurality of smart bookmarks from a requesting device, instantiation of the first smart bookmark at the requesting device is facilitated with reference to the smart bookmark configuration information corresponding to the first smart bookmark. At least some of the entries of the first smart bookmark relate to contextual metadata associated with a user associated with the requesting device.

According to various of the foregoing embodiments, the contextual metadata represents one or more of user information associated with the user, a social relationship associated with the user, a current geographic location associated with the user, a current time associated with the user, or a current topic.

According to one class of embodiments, the contextual metadata represents a social relationship associated with the user, and a first one of the plurality of entries includes vitality corresponding to the social relationship.

According to another class of embodiments, the contextual metadata represents a group to which the user belongs, and a first one of the plurality of entries refers to other members of the group.

According to yet another class of embodiments, the contextual metadata represents a first geographic location associated with the user, and a first one of the plurality of entries identifies a second geographic location in proximity to the first geographic location and relevant to the particular concept to which the entries of the smart bookmark relate.

According to still another class of embodiments, the contextual metadata represents a current geographic location of the user. Creation of a smart bookmark by the user at the current geographic location is facilitated, the particular concept to which the entries of the smart bookmark relate corresponds to the current geographic location. Thus, the user is enabled to bookmark a real-world location.

According to a further class of embodiments, the contextual metadata represents a current time associated with the user, and a first one of the plurality of entries identifies an event relevant to the current time and the particular concept to which the entries of the smart bookmark relate.

According to yet another class of embodiments, the contextual metadata represents a social relationship associated with the user. Dissemination of smart bookmark configuration information configured to enable instantiation of the smart bookmark is facilitated. The dissemination is done with reference to the social relationship to enable use of an instance of the smart bookmark by another user.

A further understanding of the nature and advantages of the present invention may be realized by reference to the remaining portions of the specification and the drawings.

BRIEF DESCRIPTION OF THE DRAWINGS

FIGS. 1-11 illustrate various aspects of "smart bookmarks" enabled by specific embodiments of the invention.

FIGS. 12-36 illustrate a variety of examples of the creation, management, presentation, sharing, and monetization of "smart bookmarks" according to specific embodiments of the invention.

DETAILED DESCRIPTION OF SPECIFIC EMBODIMENTS

Figure 2:
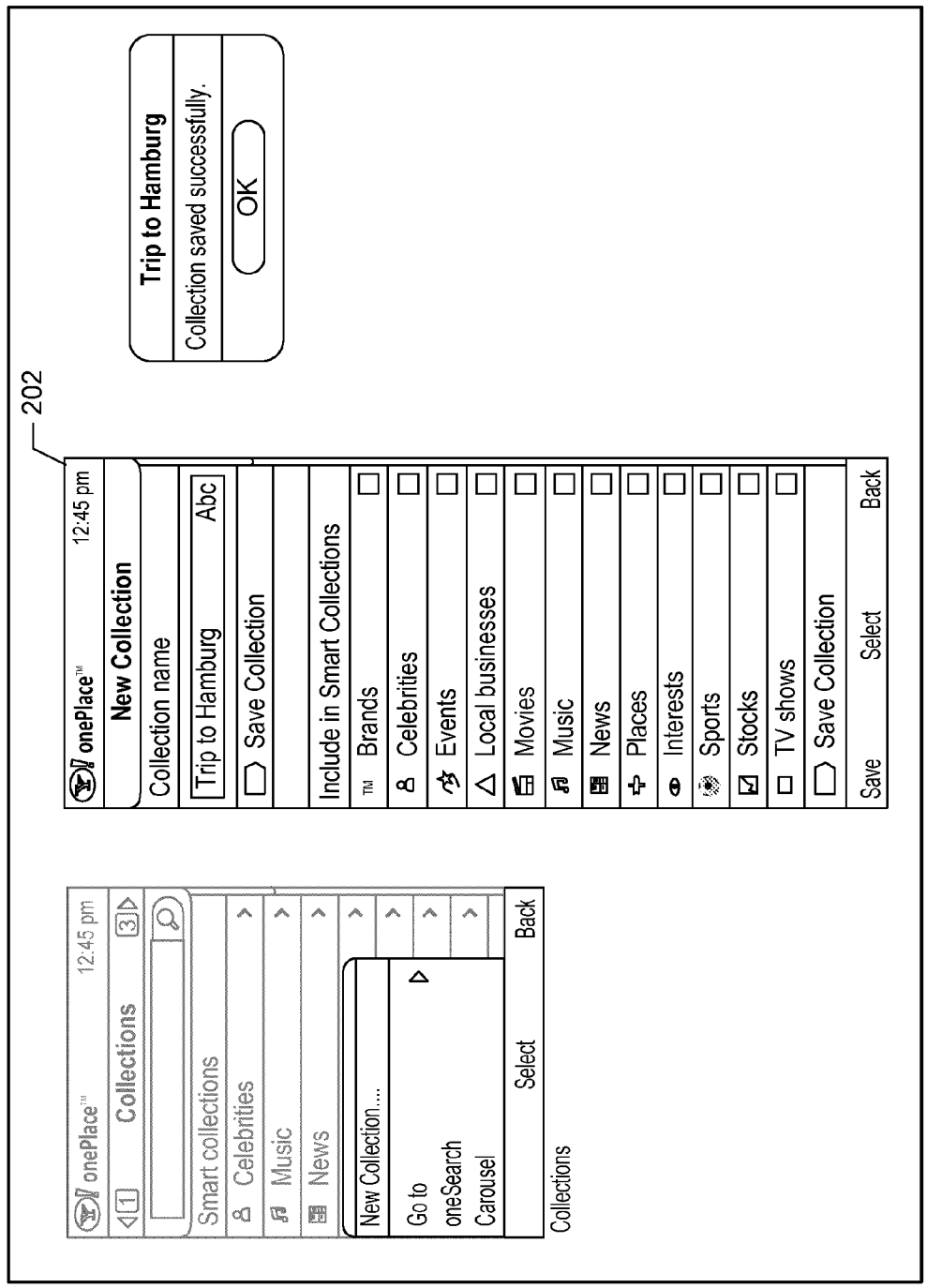

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Yahoo! Mobile includes interrelated initiatives in three major areas, referred to as oneSearch, oneConnect, and onePlace. oneSearch provides search services which aggregate and present all of the best search results clustered by type. oneConnect enables an individual to aggregate his communications and social networking across networks. onePlace enables an individual to aggregate and manage all the disparate content and feeds in which he has an interest. It should be noted at the outset that, while many of the implementations of the present invention have particular value in the context of mobile devices, embodiments of the invention are contemplated in which functionalities described herein are made available in other contexts, e.g., desk top computers, set top boxes, etc.

A short description of the operation of an implementation of the oneSearch query processor may be instructive for understanding onePlace in that there is a common underlying information paradigm from which both derive benefits. In this example, a user enters the query "apple." In addition to text in or associated with web pages and documents, the term "apple" can be mapped to a number of abstract ideas, real world objects, and digital objects and media. Collectively, these things are referred to herein as "entities." oneSearch takes the string "apple" and performs a disambiguation to determine at least some of the possible entities "apple" might represent, e.g., the company, the fruit, the record label, etc., each of which may then be mapped to one or more result types.

For example, if the entity is Apple® the company, the different result types might include geographic results (e.g., company or store locations), stock price, news stories (e.g., text and video), as well as conventional web and mobile web links. oneSearch then renders clusters of result types based on the entity or entities identified in the disambiguation phase and their respective mappings to result types. Additional information about the operation of oneSearch may be obtained with reference to U.S. patent application Ser. No. 11/651,102 entitled CLUSTERED SEARCH PROCESSING filed on Jan. 5, 2007, the entire disclosure of which is incorporated herein by reference for all purposes.

onePlace uses concepts of entities and result types similar to those employed by oneSearch in taking the conventional concept of bookmarks to an entirely new level. As used herein, the term "smart bookmark" refers to an object (or combination of objects) which represents a combination of one or more entities with one or more result types, and which facilitates dynamic access to the content in which the user has an interest.

This is to be contrasted with conventional bookmarks (such as those associated with a browser) which are typically stored as static URLs corresponding to information objects on the Web. By contrast, while onePlace smart bookmarks may encompass some or all of the functionality of conventional bookmarks, they also allow a user to bookmark any type of entity, both digital and real world, at various levels of abstraction. And even though such an entity might have multiple URLs, multiple feeds or streams, and/or multiple resources associated with it, a onePlace smart bookmark enables all of these information objects to be resolved to one entity, and, at least in some instances, a smart bookmark enables tapping into a stream of updates relating to that entity.

It should be noted that embodiments are contemplated in which the combinations or mapping of entities to result types include one-to-one, one-to-multiple, multiple-to-multiple, and multiple-to-one mappings. In some examples described herein, these various possibilities may be represented by the phrase "entit(ies) and result type(s)." It should also be noted that the range of possibilities which could be considered entities and result types for use with various embodiments of the invention is virtually unlimited. Moreover, many entities and result types may be used as either or both an entity and a result type depending on the particular application. And any relationships between entities and result type referred to herein are merely examples and should not be considered restrictive in that there can be virtual unlimited interrelations between the various different types of entities and results types (e.g., a sports league player may also be a celebrity; movies and television programs include celebrities; etc.). So, there can be containment and hierarchical relationships among entities as well as blends or composites.

Figure 1:
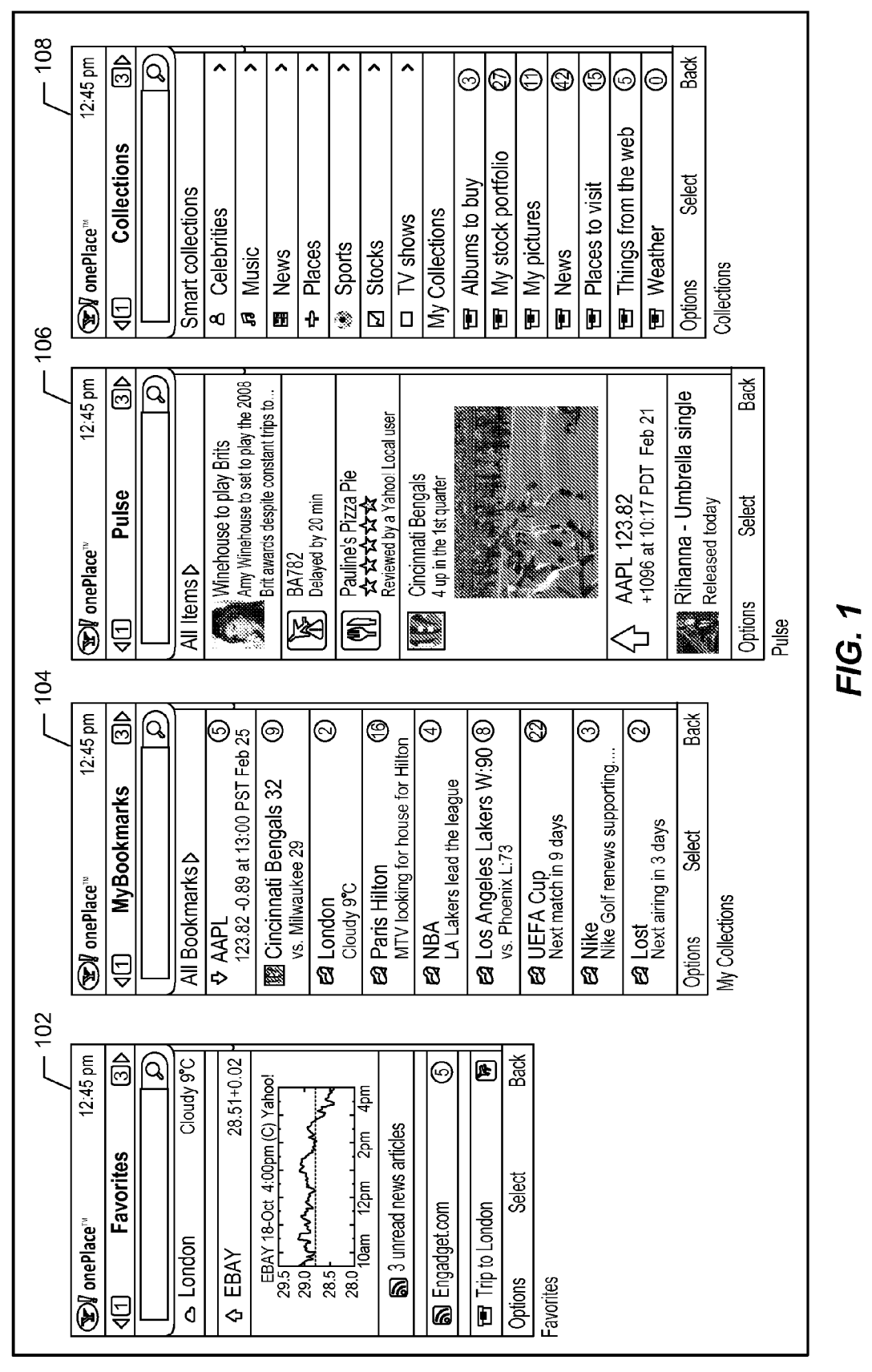

According to various embodiments and as will be discussed, smart bookmarks may be created, organized, and presented in a wide variety of ways. Some examples are illustrated in the screenshots of FIG. 1.

Screenshot 102 of FIG. 1 shows a "Favorites" view of a user's smart bookmark in which the entity "London" is associated with the result type "weather;" and the entity "eBay" is associated with the result types "stock price," "stock chart," and "RSS news article." The entity "Engadget.com" is shown to have 5 associated results of the result type "RSS feed," while the object "Trip to London" is actually a collection of travel related smart bookmarks. Bookmark collections will be further described with reference to screenshot 108.

Screenshot 104 of FIG. 1 shows an "All Bookmarks" view in which the number of associated results (e.g., new and/or unread) and some text associated with one of the results (e.g., the most recent) is shown for each entity. Like RSS feeds, these smart bookmarks are updated as new events occur. Unlike RSS feeds, they are not limited to the single source of the feed or any particular technical mechanism for transmitting the information.

According to various embodiments of the invention, smart bookmarks may be thought of as stored queries (defined by combinations of entities and results types) which notify the user of and give the user access to content of interest as it occurs, across different result types. In some cases, they may be thought of as vitality feeds relating to the associated entit(ies). Screenshot 106 shows a "Pulse" view which illustrates the dynamic, automatically updating nature of smart bookmarks according to a specific embodiment. In this view, updates for smart bookmarks with recent activity are presented. As shown, each smart bookmark update includes some representation of the recently posted content. Because a smart bookmark can be for an entity (rather than merely for a string, URL, or RSS feed), updates for a smart bookmark in the Pulse view can be of a different result type than the originally bookmarked entity/result type pair. For example, a user could bookmark the stock of the company "Apple" and see an update in the Pulse view when a news story about the company "Apple" is published. In addition, an update displayed in the Pulse view may be gathered not only from the original source of the entity, but also from other sources related to entity. For example, bookmarking the URL of an "Amy Winehouse" web page is resolved to the "Amy Winehouse" entity, and as such updates from a different source, but about the same entity (e.g., a review of an Amy Winehouse album on another web site) may then appear in the Pulse view for the "Amy Winehouse" smart bookmark.

Screenshot 108 shows a "Collections" view which illustrates the notion of groupings or collections of smart bookmarks. These may include "Smart Collections" which are automatic groupings of the user's smart bookmarks according to relationships among entities and/or result types as well as, in some embodiments, relationships to and among other data and metadata, such as, for example, the spatial location of the user (e.g., "Near Me"), temporal metadata (e.g., "Valentine's Day"), the user's social connections or group affiliations (e.g., "Family Favorites" or "Popular in My Company"), automatically clustered topical metadata among a user's smart bookmarks (e.g., "Obama and Clinton"), and/or combinations of these, etc. These may also include collections created by the user, i.e., "My Collections," which may have an associated indicator of the number of recent and/or unread results. This allows the user to consolidate and manage his smart bookmarks. An example of creation of a collection is illustrated in screenshots of FIG. 2. As shown in screenshot 202, the user can explicitly identify in which of the automatically generated "Smart Collections" the collection should be included.

Figure 3:
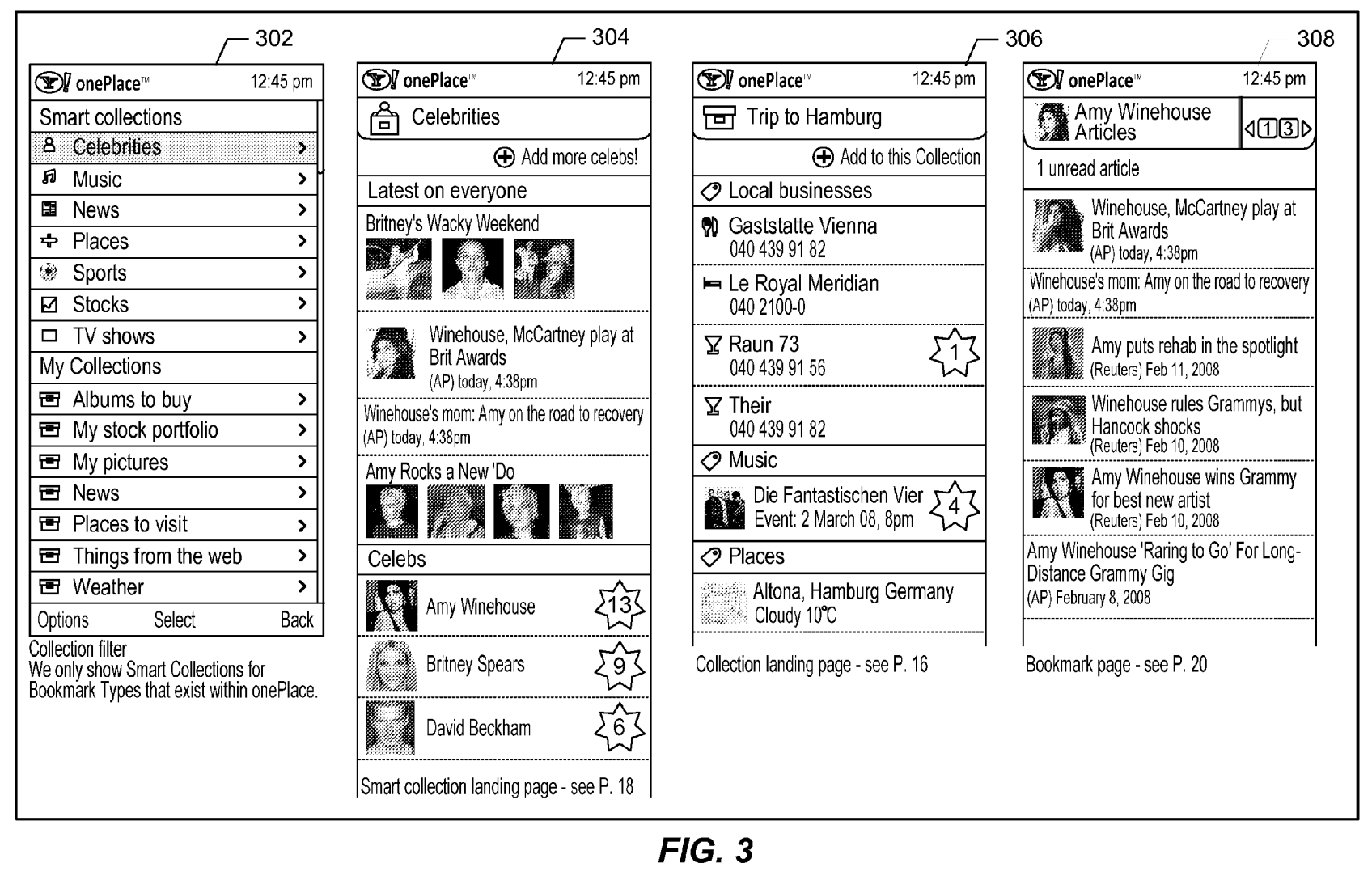
Figure 4:
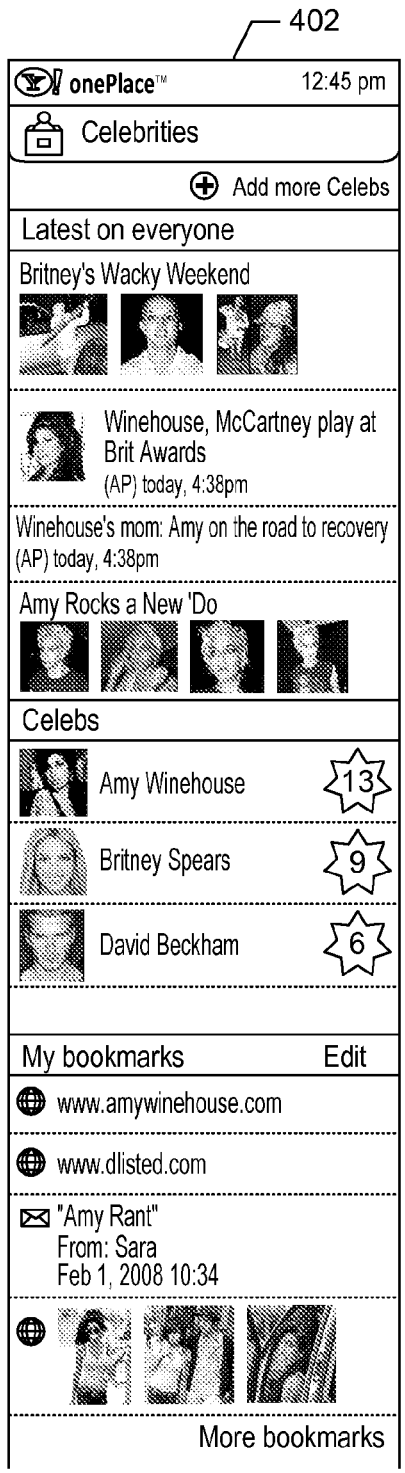

The screenshots of FIG. 3 and FIG. 4 illustrate some further aspects of collections of smart bookmarks. Selection of the Smart Collection "Celebrities" in screenshot 302 results in presentation of the user's smart bookmarks filtered by celebrities for which there has been recent activity (e.g., screenshots 304 and 402). Some of these may be in more expanded views with, for example, visible content while other can be in less expanded views showing, for example, only the celebrity's name and headshot along with an icon indicating the number of new and/or unread events. Selection of the Amy Winehouse smart bookmark in screenshot 304 results in presentation of smart bookmarks and associated results as shown in screenshot 308. Selection of a "Trip to Hamburg" collection results in presentation of smart bookmarks relating to Hamburg and clustered by result type as shown in screenshot 306.

The manner in which result types are associated with entities to create smart bookmarks may vary considerably without departing from the scope of the invention. For example, in embodiments based on a oneSearch model, a set of result types may be implicitly associated with each entity at the back end. In another example, a user may create a smart bookmark by explicitly selecting the combination of entit(ies) and result type(s). That is, for example, the user may define a smart bookmark by selecting a subset of the result types mapped to a particular entity as determined, for example, by the oneSearch query processor.

Alternatively, or in combination with such an explicit selection, the combination of entit(ies) and result type(s) may be done automatically with reference to, for example, information about the user or information about the behavior of a population of users (e.g., preferences or behavior patterns). For example, if the user (or other users having similar characteristics to the user) typically consumes a particular set of result types relating to a particular entity or similar entities, that set of result types might be suggested and/or automatically associated with that entity during smart bookmark creation.

In addition, a given combination of entit(ies) and result type(s) may change over time to reflect changes in behavior or new behavior of the user and/or the population of users, or in response to events (e.g., publication of content) relating to the entit(ies).

As will be understood these and other approaches, as well as combinations of these and other approaches, may be employed to create an association of one or more entities with one or more result types by which dynamic access to content of interest may be provided.

Figure 5:
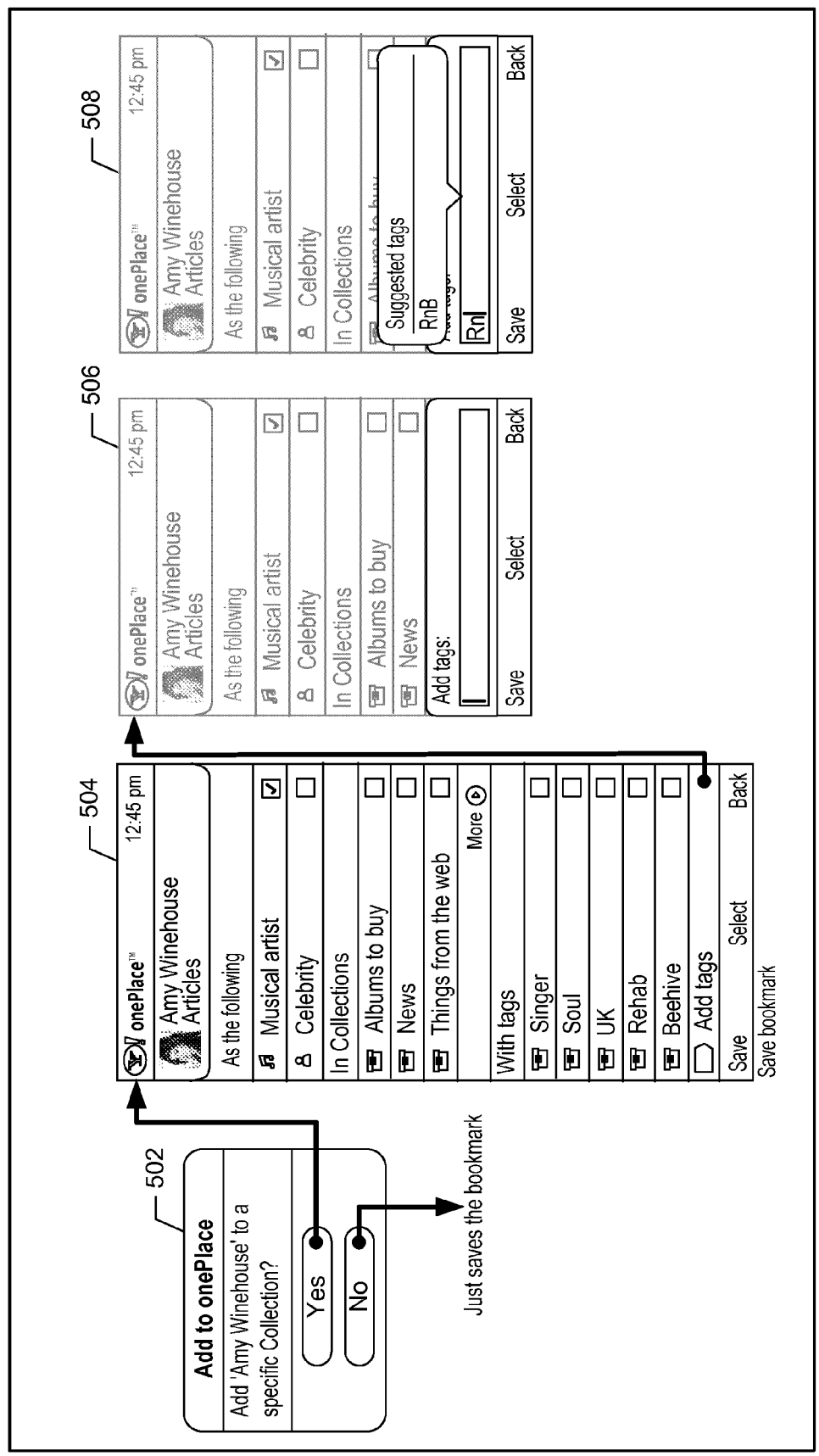
Figure 6:
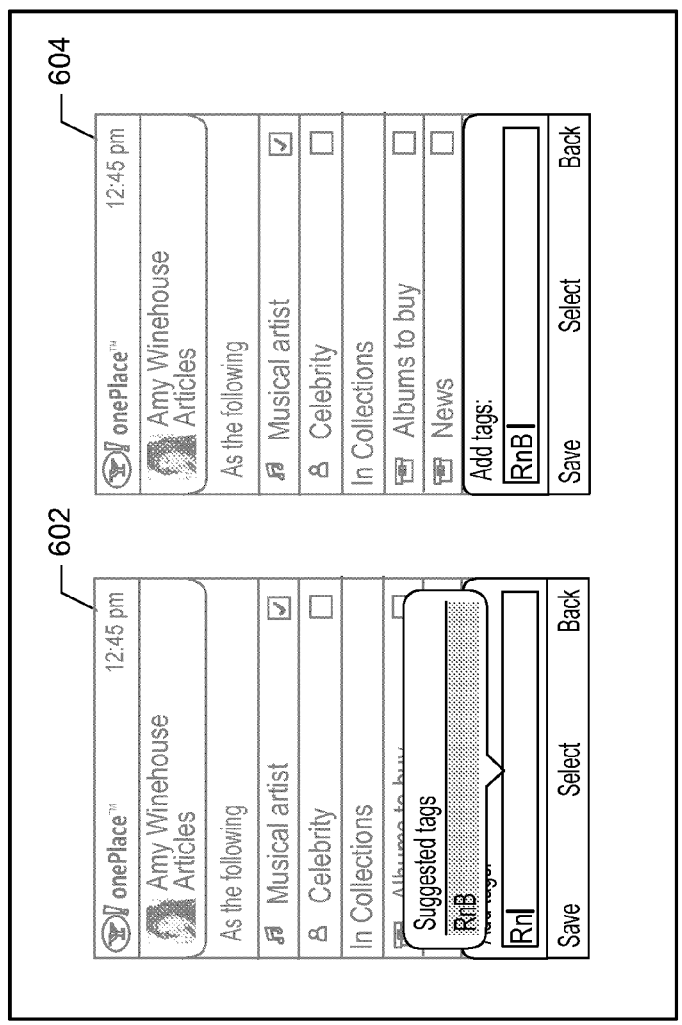

An example of creation of a smart bookmark is illustrated in the screenshots of FIG. 5 and FIG. 6. In screenshot 504, the user is able to help with entity disambiguation by identifying one or more categories (e.g., musical artist or celebrity) by which the entity may be identified, and by optionally selecting one or more tags which relate to the entity. The user may also designate one or more collections to which the new smart bookmark should belong.

Figure 7:
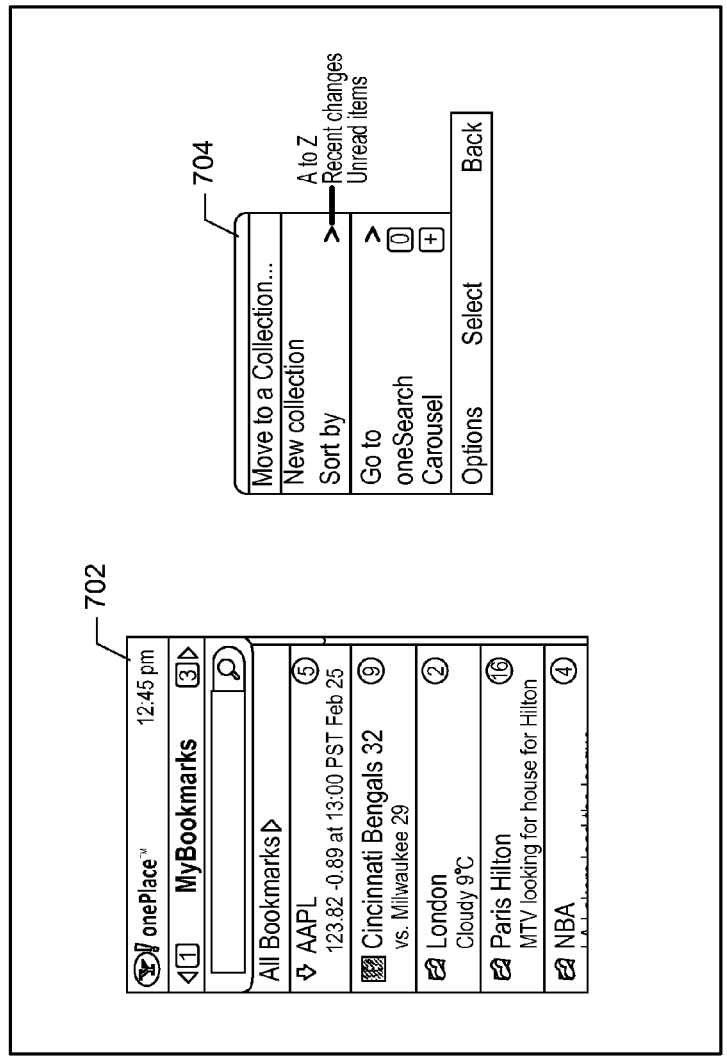

In addition to facilitating disambiguation, tags may facilitate searching for the content with which the smart bookmark is updated. The user may also be enabled to add his own tags as illustrated in screenshots 506 and 508, and 602 and 604, in which the user begins entering a tag, in response to which a tag is suggested and selected by the user. This is like an auto-completion function in which the suggested tag might be derived in this example from other musical artists like the one that is the subject of the smart bookmark. Alternatively, multiple suggested tags could be presented to a user before, during, and/or after the user begins to input a tag. Moving an existing smart bookmark to a collection is illustrated in screenshots 702 and 704 of FIG. 7.

Figure 8:
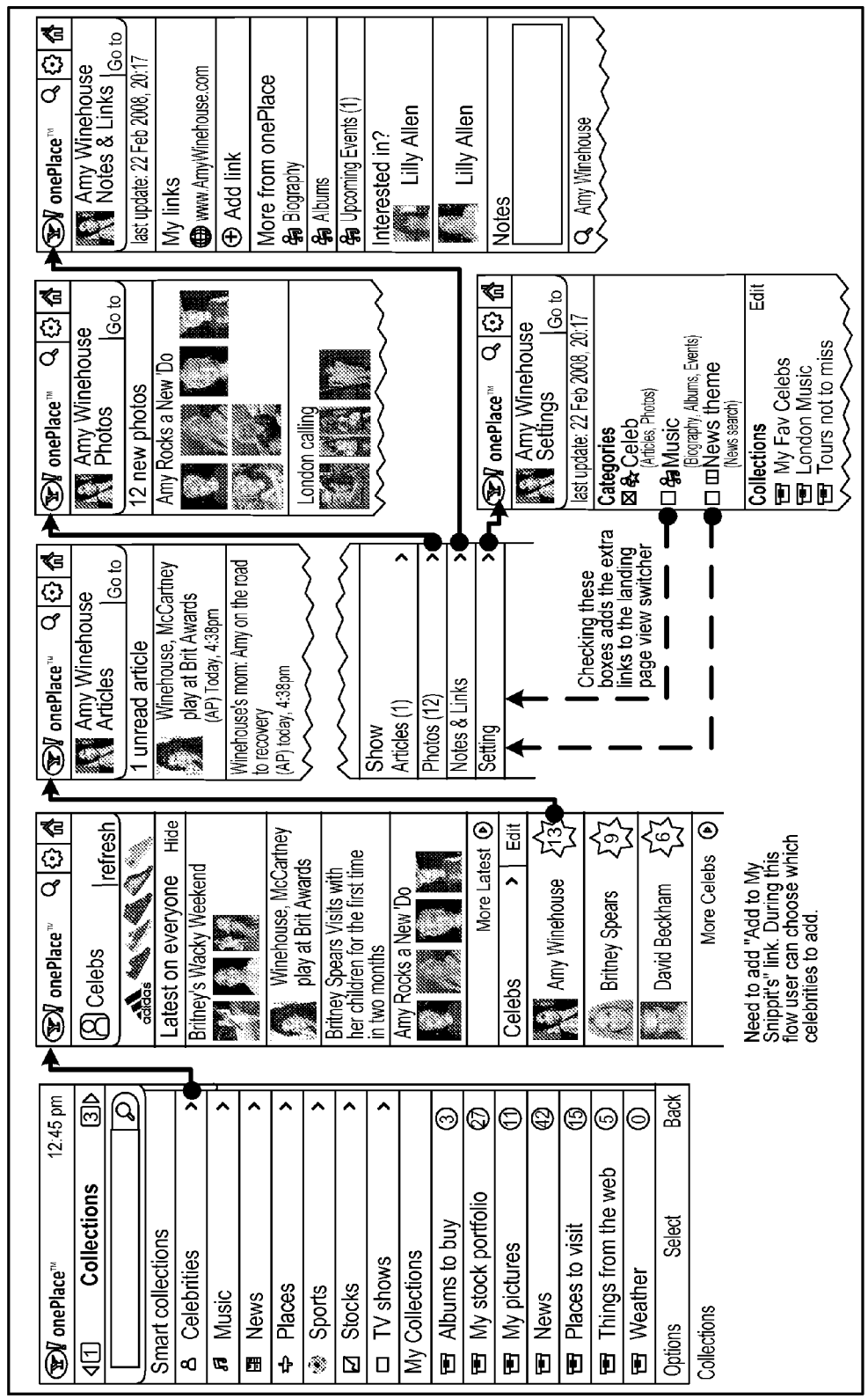
Figure 9:
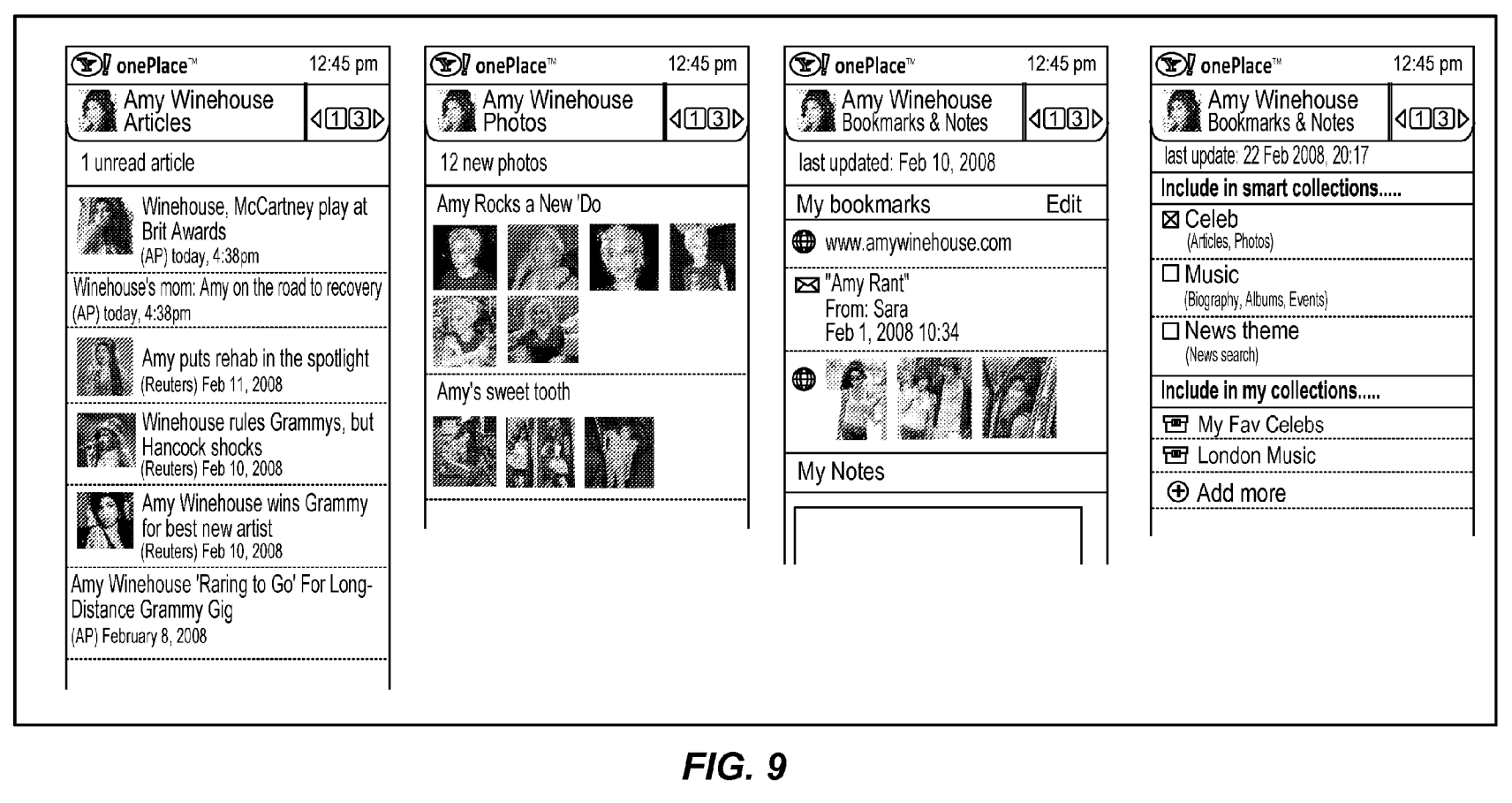

The screenshots of FIG. 8 and FIG. 9 illustrate a user successively navigating from a high level view of his smart bookmarks to increasingly granular views by selecting a Smart Category (in this example, Celebrities), selecting a smart bookmark corresponding to a particular celebrity, and then selecting various result types (e.g., articles, photos, notes and links), or a settings option in which the user may modify parameters affecting the manner in which the smart bookmark operates or select a collection in which to include the smart bookmark.

The screenshots of FIG. 10 illustrate various examples of different ways in which the smart bookmarks associated with a particular collection (in this case "Trip to Hamburg") may be presented. In screenshot 1002, the smart bookmarks are clustered by category (e.g., entity type) and presented alphabetically within each category. In screenshot 1004, the smart bookmarks are presented by relevance, i.e., those smart bookmarks which have been recently updated, followed by smart bookmarks having no recent updates sorted by the date added. Screenshot 1006 shows an alphabetical sort of all of the user's smart bookmarks. Many other types of views of smart bookmarks in collections are possible, such as, for example, to present smart bookmarks spatially on a map of the locations where they were created, the locations they refer to, and/or the locations where they are accessed. Similarly, one could view smart bookmarks in a collection temporally in a timeline or calendar of the times/events when they were created, the times/events they refer to, and/or the times/events where they are accessed. Similarly, one could view smart bookmarks in a collection socially in a graph or list or grid of the people who created them, the people they refer to, and/or the people accessed them. Similarly, one could view smart bookmarks in a collection topically in a tag cloud or topic index of the topics they refer to and/or relate to. Various combinations of these views are also possible combining views of the smart bookmarks in a collection (and optionally clusters of these smart bookmarks) according to their spatial, temporal, social, and topical metadata.

Figure 11:
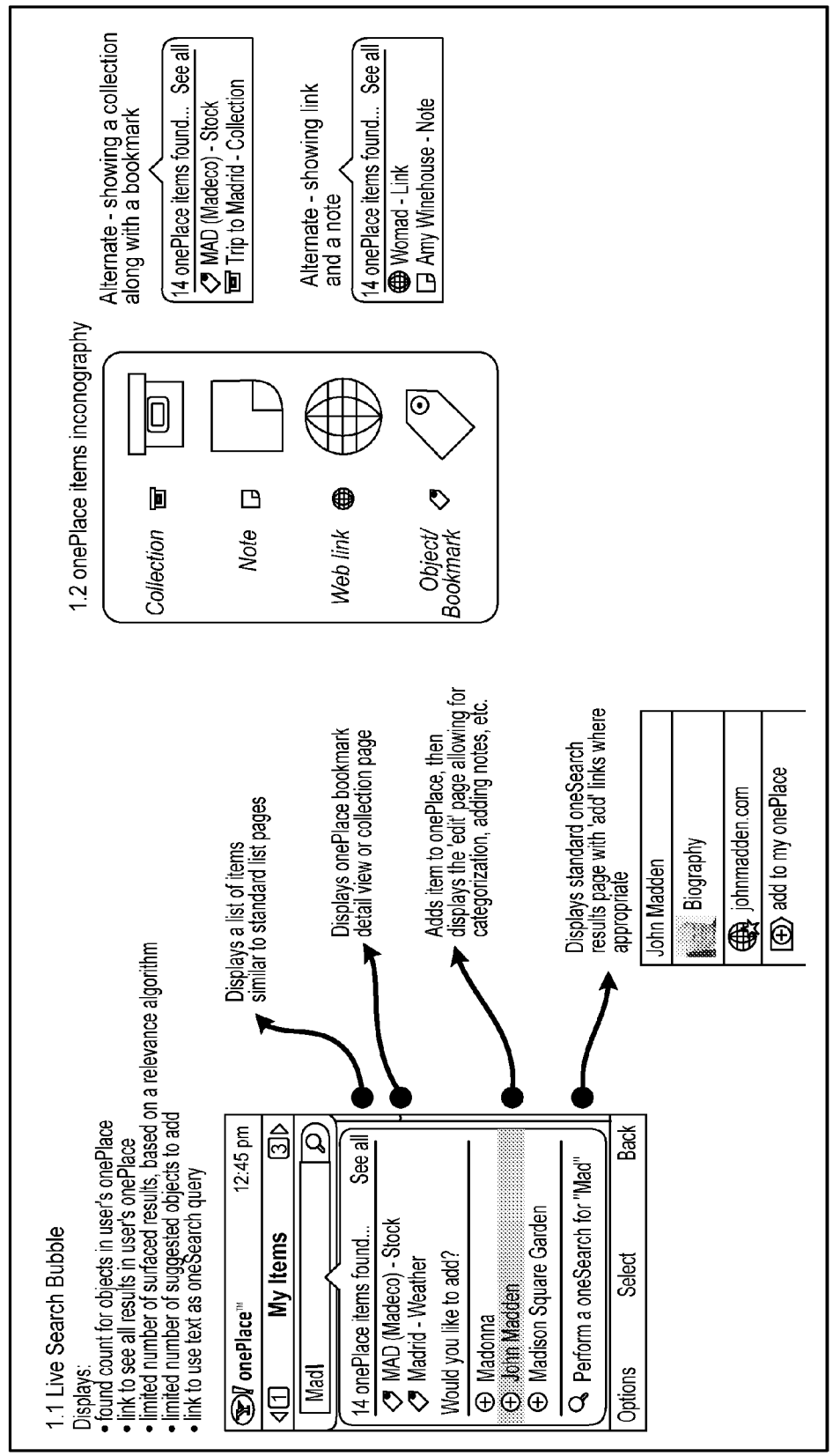

According to some embodiments, the presentation, management, and creation of smart bookmarks can be integrated with search. An example is illustrated in the screenshots of FIG. 11. As the user is typing in the search query "Mad," relevant ones of the user's smart bookmarks are surfaced, i.e., the stock price for Madeco and the weather in Madrid, as well as a link to all of the relevant smart bookmarks (i.e., entity/result type combinations) from the user's collection. In addition, because of its knowledge of entities, the system also suggests other possible entities and/or smart bookmarks to add to the user's collection which relate to the search query as entered so far, i.e., Madonna, John Madden, Madison Square Garden. So unlike standard search services, oneSearch and onePlace can operate on the level of entities rather than just on the level of web links or strings.

According to some embodiments of the invention, various levels of sharing of a user's smart bookmarks are enabled. For example, a user may be enabled to allow other users to see his smart bookmarks, to affirmatively share his smart bookmarks with others, to see what others have bookmarked, to see who has bookmarked the same or similar things, etc.

According to some embodiments, the aggregation of social relationships across various networks enabled by oneConnect may be leveraged to further enhance the manner in which users share and interact with their smart bookmarks. That is, for example, a user's smart bookmarks may be thought of as another form of personal information or vitality which can be shared among the people in the user's network using such techniques. Additional information about the operation of oneConnect may be obtained with reference to U.S. patent application Ser. No. 12/069,731 for IDENTIFYING AND EMPLOYING SOCIAL NETWORK RELATIONSHIPS filed Feb. 11, 2008, the entire disclosure of which is incorporated herein by reference for all purposes.

Moreover, any of the generation, management, presentation, and/or sharing of smart bookmarks may be enhanced with the understanding of who the user is, where the user is, the current time, and what the smart bookmarks relate to. That is, spatial, temporal, social, and/or topical metadata may be leveraged, for example, in the creation and/or modification of entity/result type combinations, to bias presentation of results, as well as to facilitate organization and sharing of smart bookmarks.

For example, knowledge of the user's location or the current time can be used to affect the ordering of smart bookmarks in a given view and/or the result types which are surfaced. In the example of FIG. 11 described above, if the user is known to be in Madrid, the smart bookmarks surfaced and/or the entities suggested may be selected based on that knowledge, in which case, for example, the Madrid weather smart bookmark (and possibly others among the user's smart bookmarks) would likely be presented before the stock price for Madeco. Similarly, if a user has a smart bookmark relating to a particular sports franchise, and the team is currently playing, then the result type deemed most relevant at the current time might be the current score of the game. More generally, any of the views of the screenshots of FIGS. 1-11 may be biased with reference to where/when/who/what (W4) metadata.

The screenshots of FIGS. 12-19 provide examples of some of the ways in which the smart bookmarks of onePlace may be shared and/or monetized, and also ways in which W4 metadata may be leveraged to create, manage, present, and share smart bookmarks.

Assume that a user has created a smart bookmark or a collection for his favorite sports franchise, the Boston Red Sox. Selection of that smart bookmark or collection would bring the user to a landing page as described above with reference to screenshots 304 and 402 of FIGS. 3 and 4. Such a landing page might include much of the content shown in screenshot 1202 of FIG. 12 which represents either oneSearch search results in response to the search query "Boston Red Sox" or the a landing page for the "Boston Red Sox" smart bookmark in the case in which the user has Contacts who have made their onePlace smart bookmark for the "Boston Red Sox" known to other people to all other users or to some permissioned subset of other users (such as contacts, connections, friends, family, coworkers, classmates, etc.).

With the addition of the knowledge of the user's social relationships (e.g., as enabled by oneConnect), the search results can include results like those shown in screenshot 1204 which represent communication circuits by which the user may communicate with other people, e.g., results for contacts who also like the Red Sox, contacts who hate the Red Sox, and even results for people outside of the user's social relationships who are Red Sox fans. Similarly, with the knowledge of W4 metadata (e.g., location), the search results can include results like those shown in screenshots 1206 and 1208, e.g., Boston sports bars that users have bookmarked with the "Boston Red Sox" and/or the "Sam Adams" smart bookmarks. And as shown in FIG. 13, there are a variety of monetization opportunities associated with smart bookmarks relating to the Boston Red Sox.

For example, screenshot 1302 illustrates sponsorship opportunities (1 and 2) for different types of content; in this example, sports scores and a video clip. Sponsorship of a contest (3) is shown in screenshot 1306. Screenshot 1306 also includes an entry for limited edition gifts (4), as well as both geographically determined and online offers (5). Screenshot 1308 includes shopping links, e.g., ringtones, etc. (6).

Figure 14:
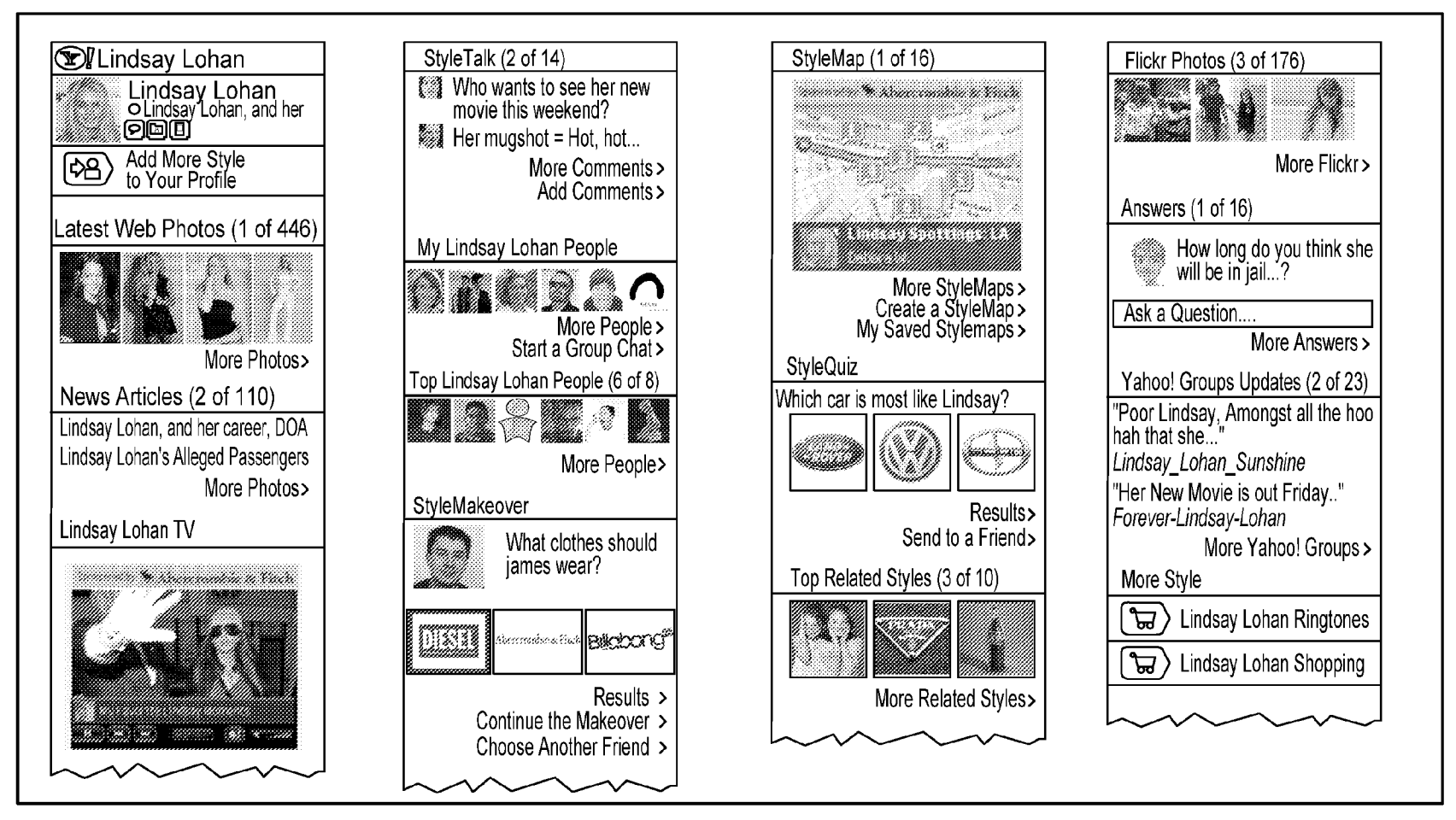
Figure 15:
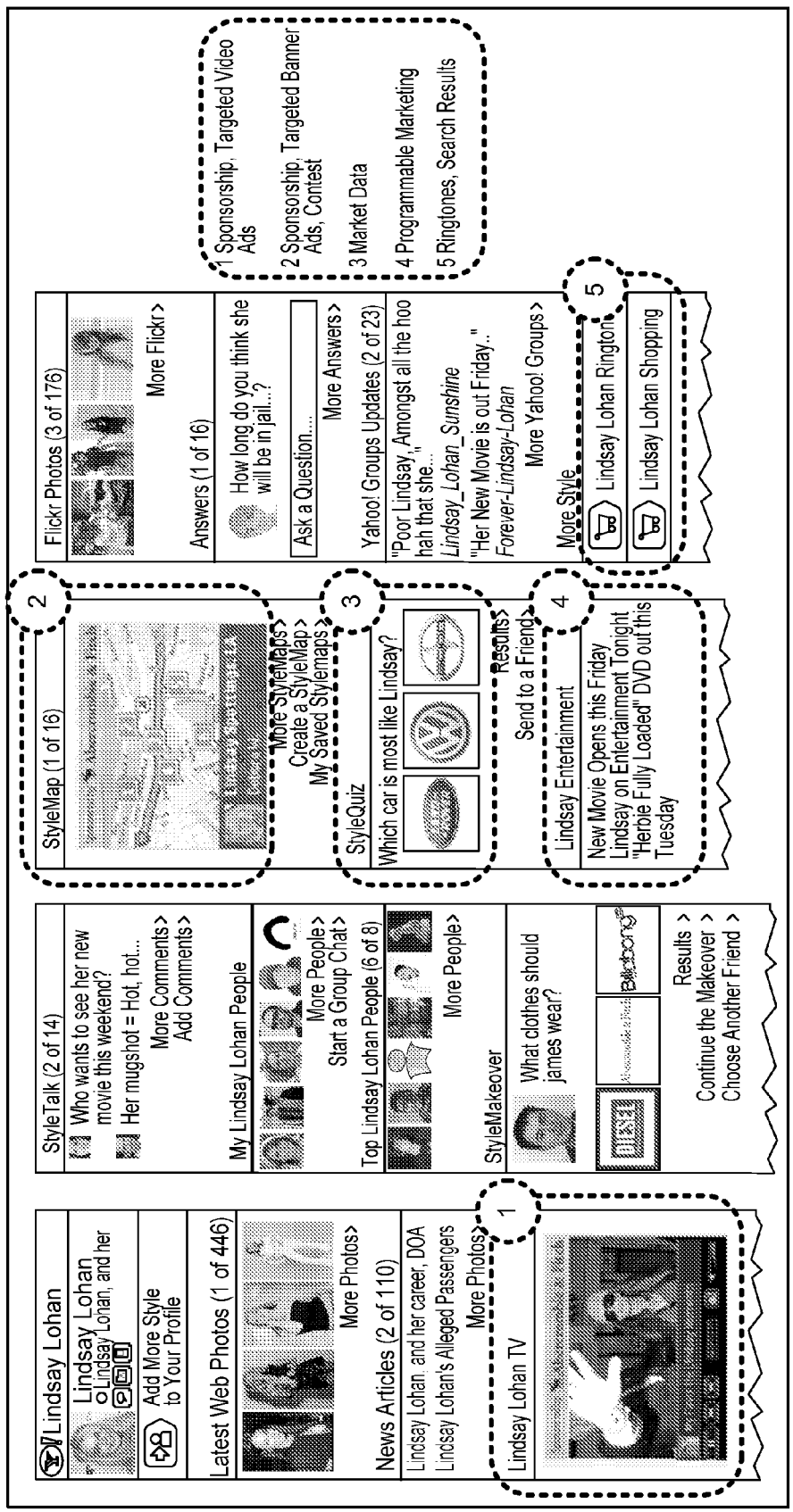
Figure 16:
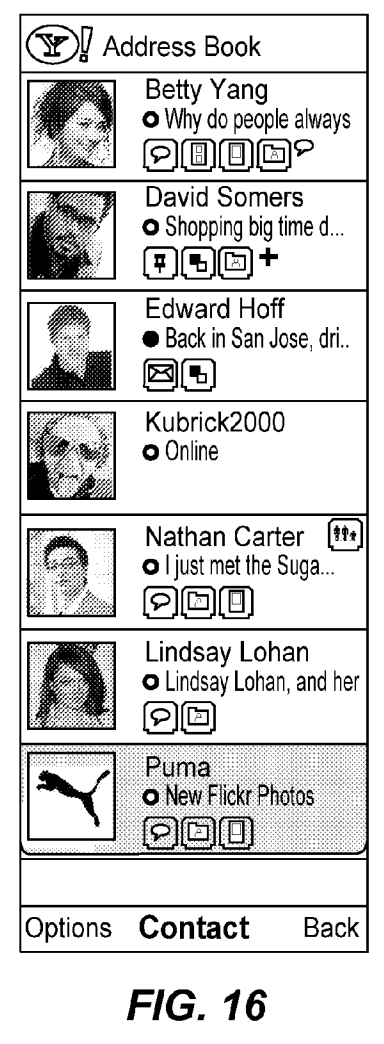
Figure 17:
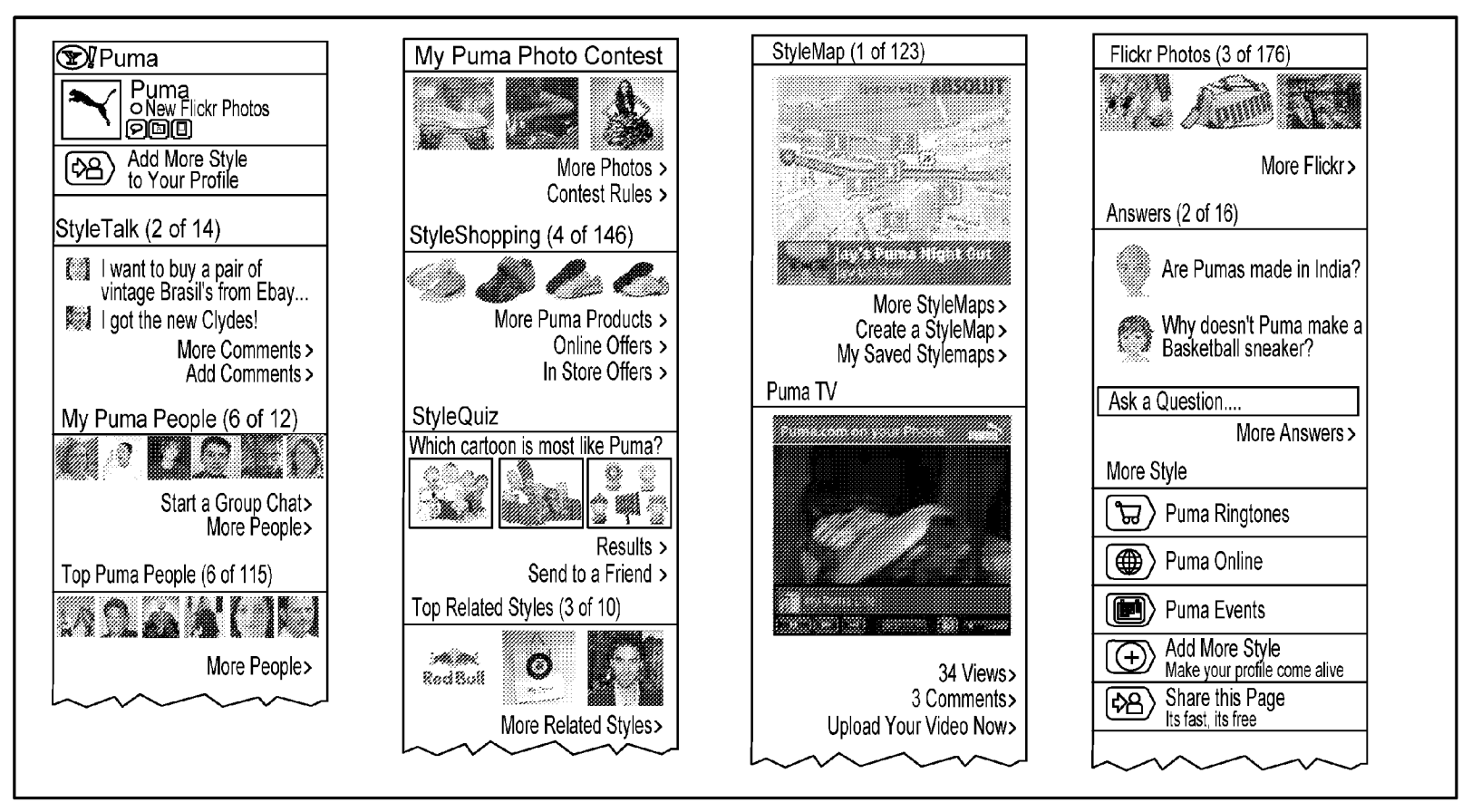
Figure 18:
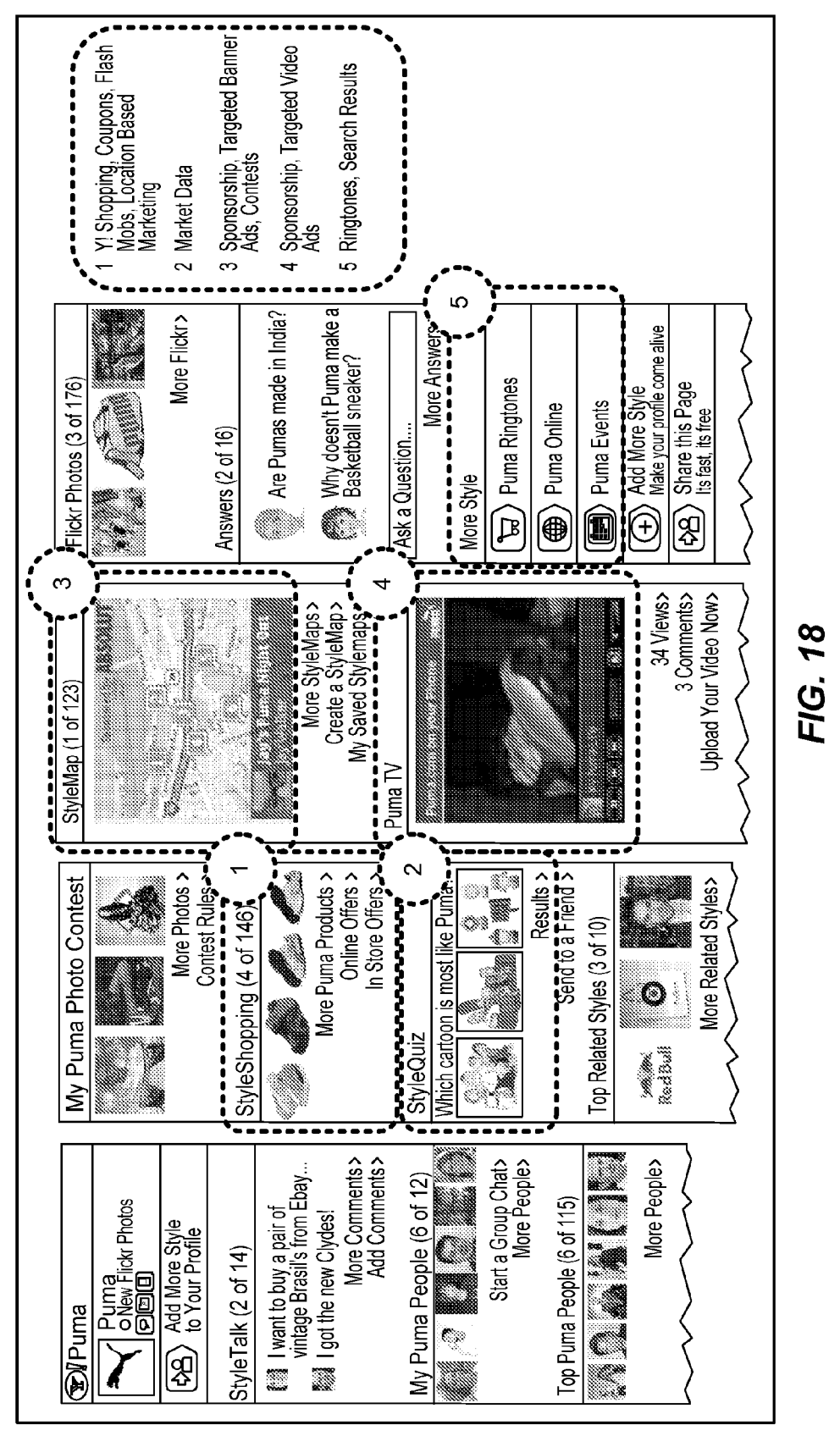
Figure 19:

Similarly, smart bookmark relating to "Lindsay Lohan" may be enhanced with reference to either or both of social relationship data and W4 metadata (which may also include social relationship data), with similar monetization opportunities as shown in the screenshots of FIGS. 14 and 15. Yet another set of monetization options are illustrated in the screenshots of FIGS. 16-18, in which the user's expressed interest in footwear and accessories is used in a variety of ways, e.g., to filter and/or organize content and social relationships, to sponsor a photo contest, to sell products, to conduct market research, to present video advertising, etc. FIG. 19 shows additional monetization opportunities relating to Coca-Cola. It will be understood that the monetization opportunities illustrated in FIGS. 12-19 represent a small subset of the possible ways in which smart bookmarks enabled by various embodiments of the invention may be monetized. A wide range of other opportunities will be appreciated by those of skill in the art.

In the context of onePlace, the "stored queries" represented by a user's smart bookmarks and collections of smart bookmarks result in the presentation of results such as those generated in accordance with oneSearch, except that the results are not static. That is, the dynamic nature of onePlace smart bookmarks enables the user to access the most current content and vitality which relates to the entities in which he has an interest. And the sharing and monetization opportunities described above with reference to the screenshots of FIGS. 12-19 are similarly enabled.

For example, in addition to other users interested in the Red Sox with whom a user has social relationships, there may be other users in the same geographic location, e.g., San Francisco, who have smart bookmarks relating to the entity Boston Red Sox. Using the understanding of where the user is and, for example, places those unrelated users congregate, recommendations could be made to the user regarding possible smart bookmarks, e.g., San Francisco sports bars frequented by Red Sox fans. Further, temporal metadata (e.g., Red Sox telecast at 4 pm) may be employed to predict or announce gatherings of Red Sox fans at such locations, and to incorporate such vitality into the user's smart bookmarks. As will be understood, the ways in which social relationship data and/or W4 metadata might be employed in a particular context to facilitate creation, management, presentation, and sharing of smart bookmarks is virtually limitless.

It should be noted that monetization opportunities associated with the present invention do not necessarily rely on social relationship data. For example, the very nature of a particular user's smart bookmarks creates opportunities for these and various other types of monetization. For example, integrated in a smart bookmark collection relating to the Boston Red Sox could be ads for purchasing Red Sox tickets or memorabilia. Or discount flights to London could be associated with a smart bookmark for London weather. Or sponsor logos or ads could be integrated with video feeds or new articles associated with a smart bookmark. Or advertisers could sponsor presentation of particular content or vitality. Examples of these and other monetization opportunities which may be employed with various embodiments of the invention are provided in various ones of the screenshots of FIGS. 12-19. Any view of a user's smart bookmarks (e.g., landing pages, pulse view, etc.) provides such opportunities. And because onePlace smart bookmarks can be analogized to stored queries as described above, it then follows that virtually any type of monetization associated with conventional search can be applied to this context. The possibilities are numerous.

Figure 20:
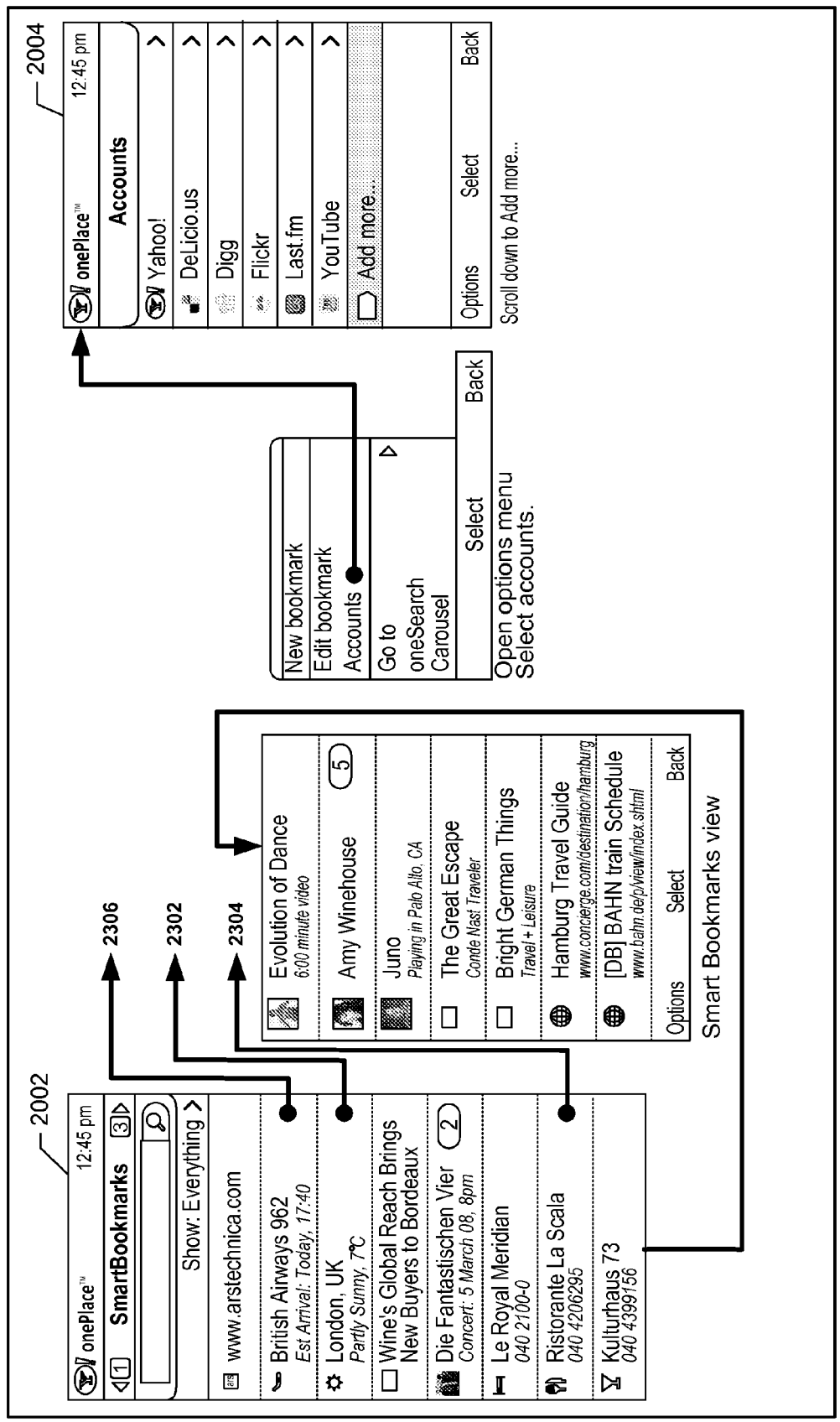
Figure 21:
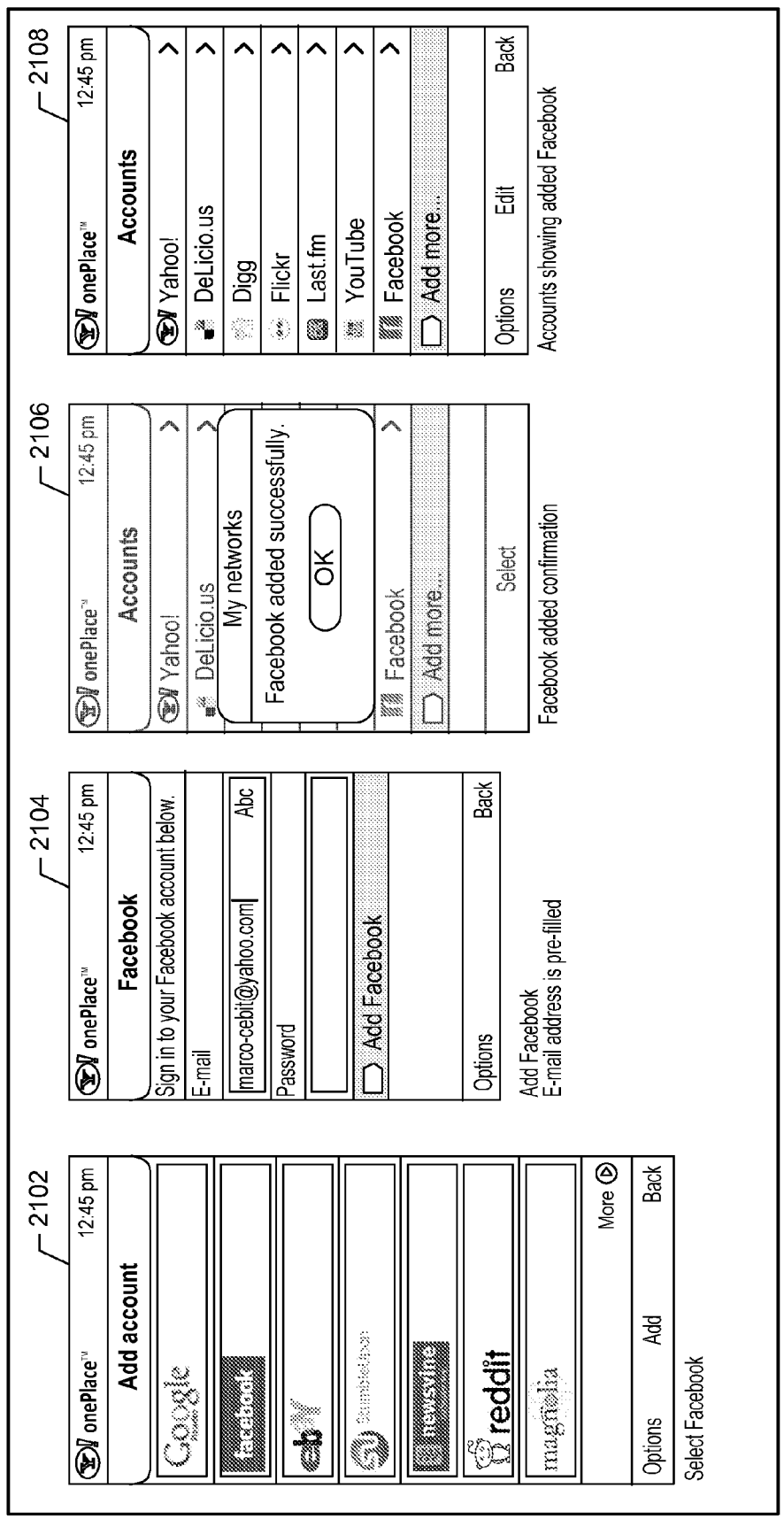
Figure 22:
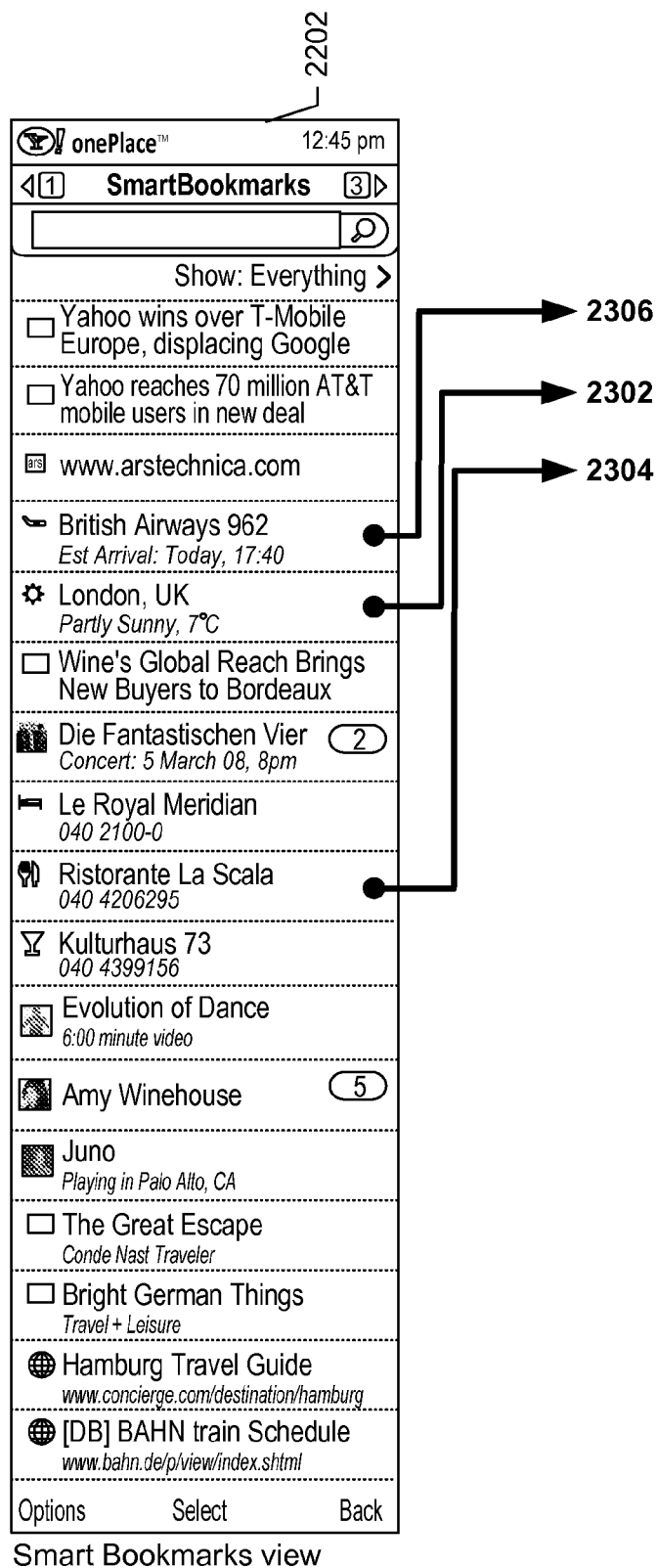

The slides of FIGS. 20-36 illustrate further examples of the creation, management, presentation, sharing, and monetization of smart bookmarks according to various embodiments of the invention. For example, screenshots 2004 and 2102-2108 of FIGS. 20 and 21 illustrate the ability of the user to designate data sources from which smart bookmark updates may be derived including, for example, the networks and accounts with which he is connected or of which he is a member. Screenshots 2302-2306 of FIG. 23 show the landing pages for the corresponding smart bookmarks selected in screenshot 2002 or screen shot 2202.

Figure 24:
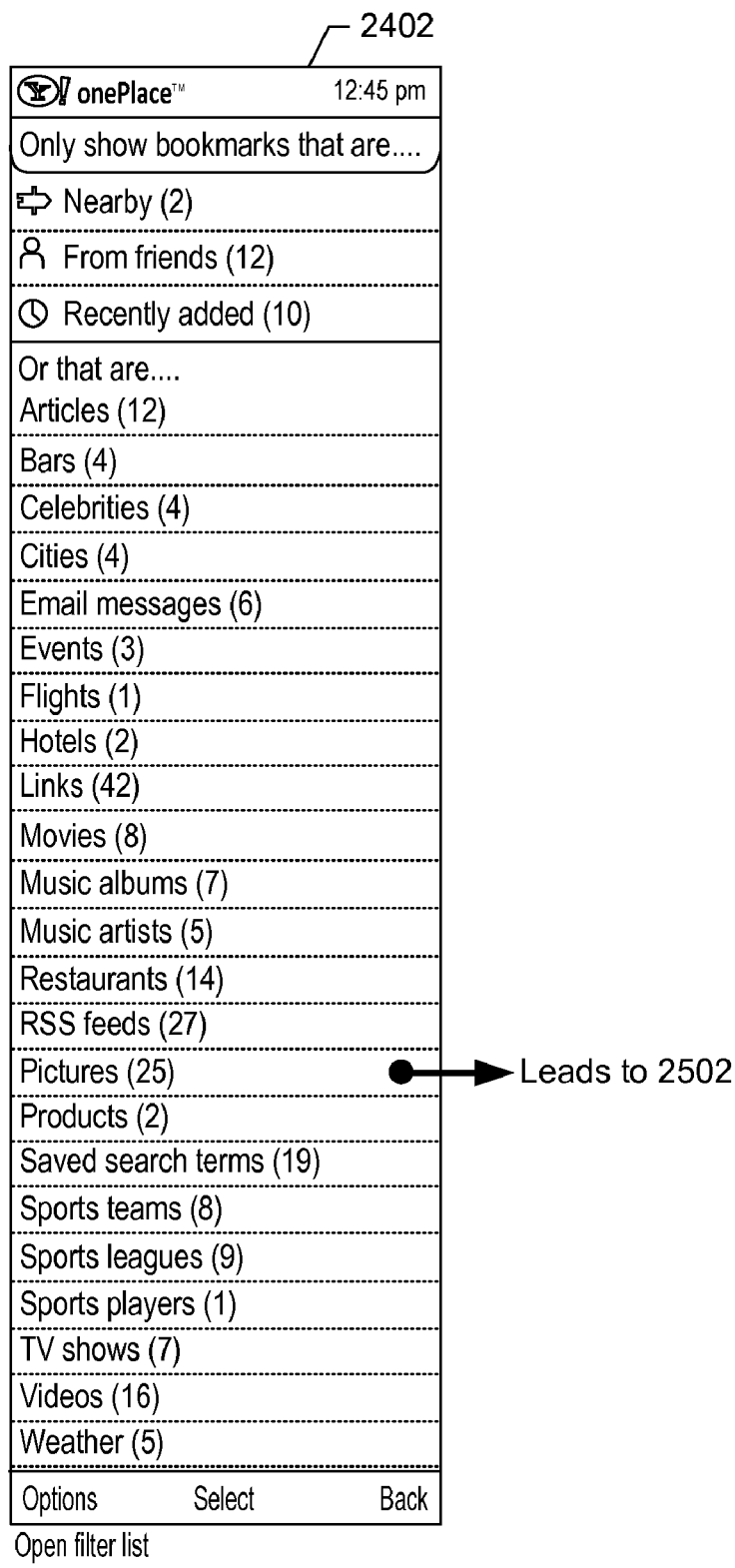
Figure 25:
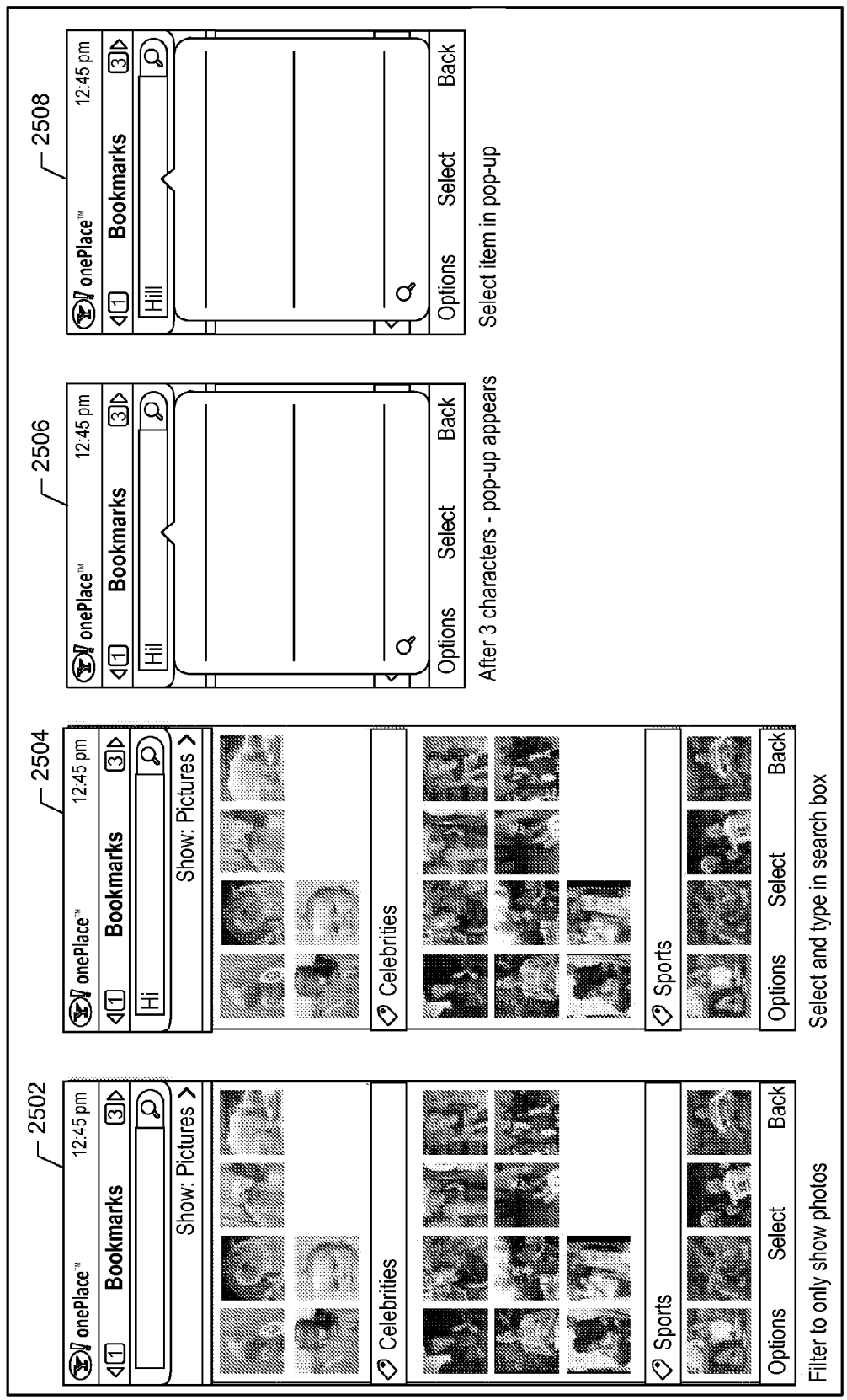
Figure 26:
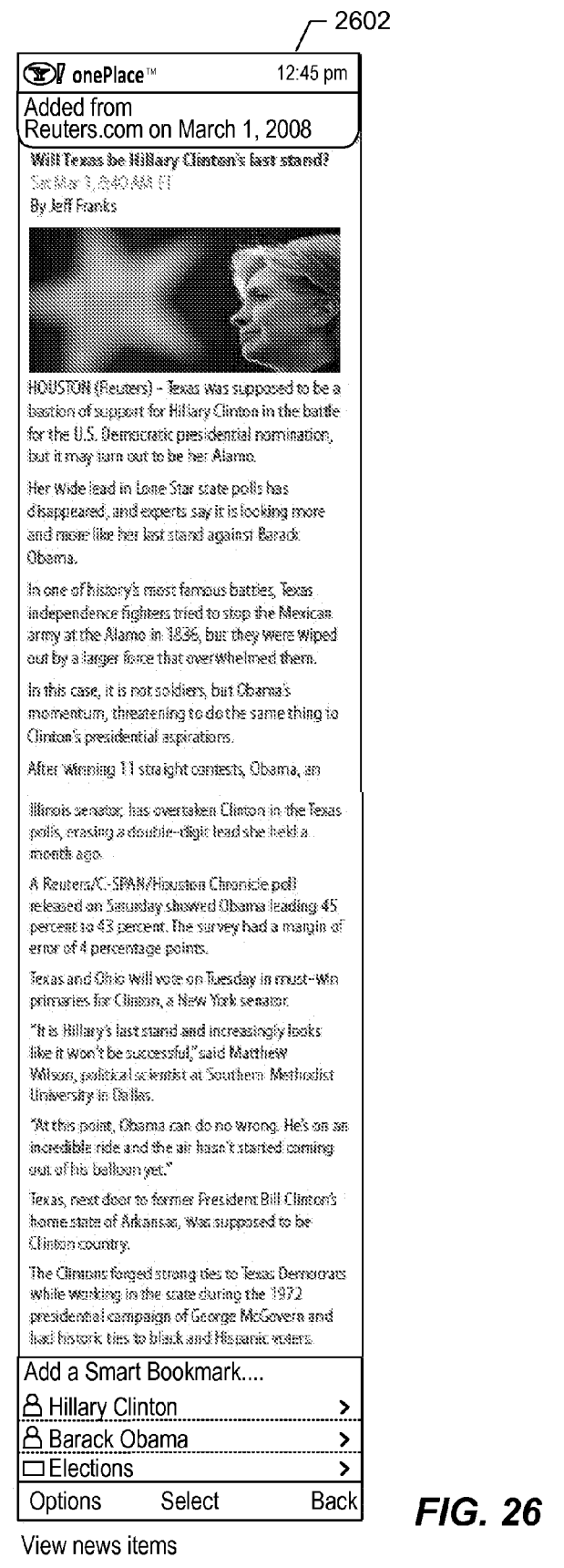
Figure 28:
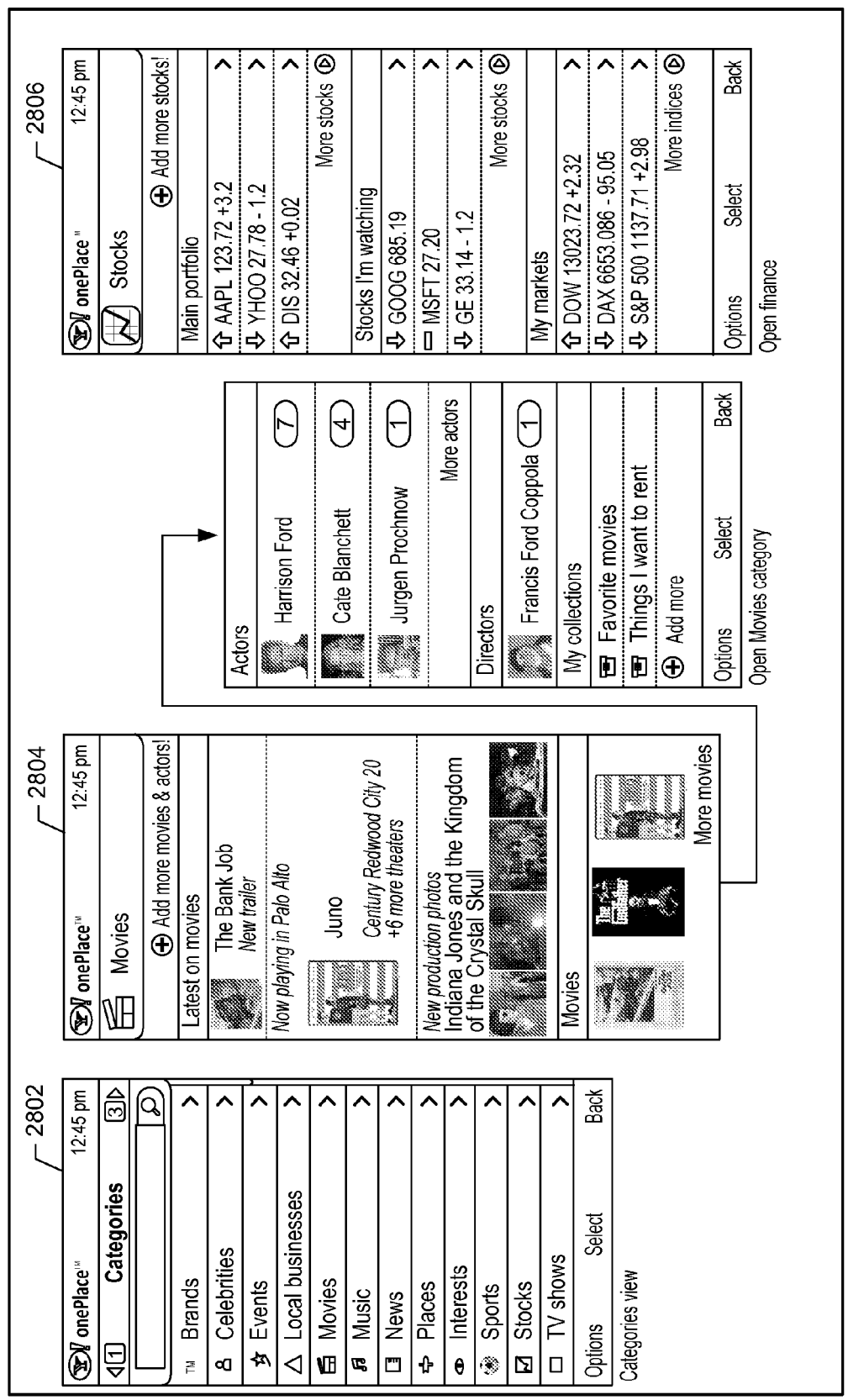
Figure 31:
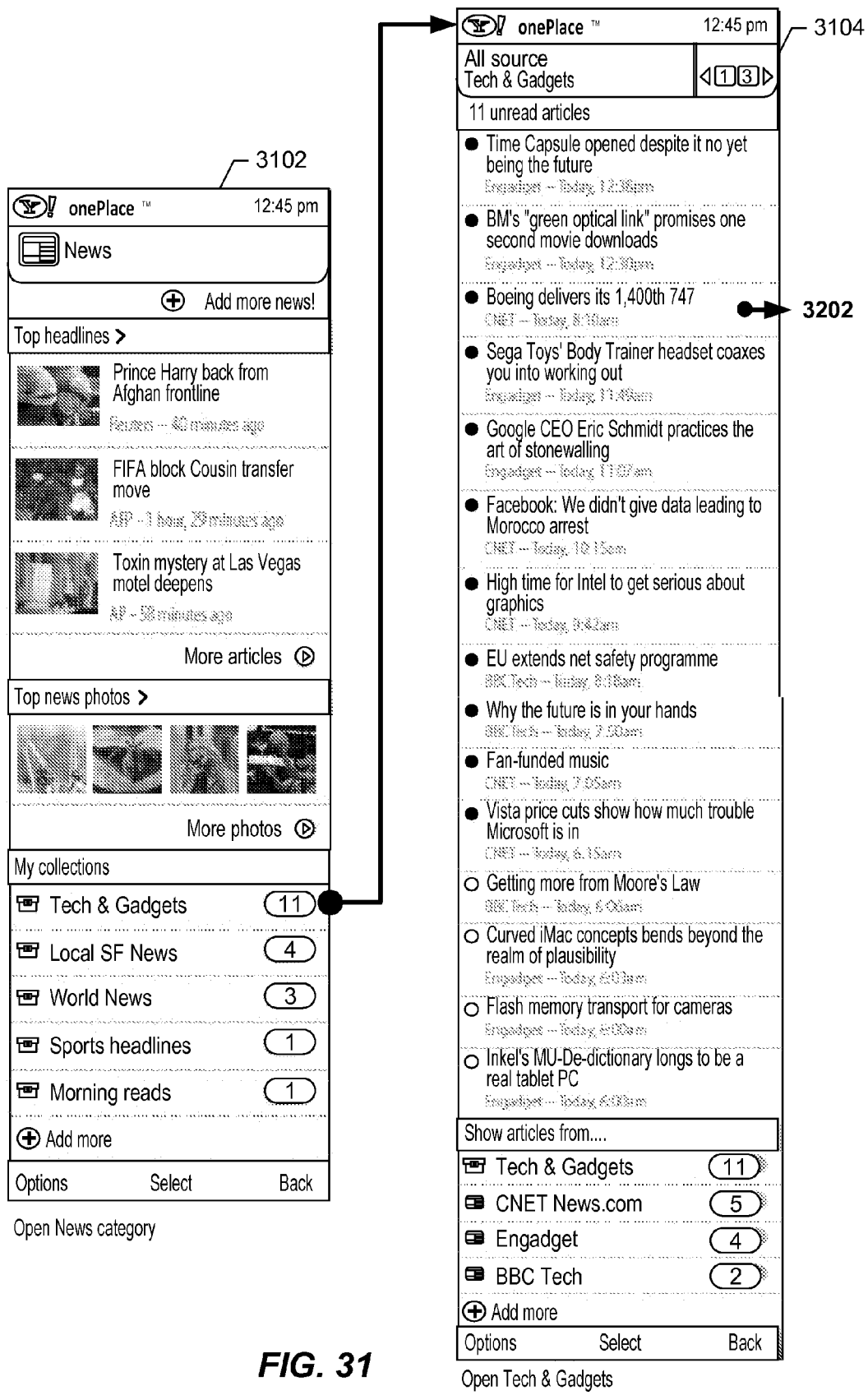

The view screenshot 2402 of FIG. 24 illustrates the concept of filtering of smart bookmarks. As shown, the user is given the option of filtering bookmarks with reference to various W4 metadata (e.g., location, social relationships, time, etc.), as well as different categories (e.g., entity types, result types, etc.). Selection of the "Pictures" option results in the view of screenshot 2502 of FIG. 25 in which only smart bookmarks with photos are featured. The views in screenshots 2504-2508 of FIG. 25 and screenshot 2602 of FIG. 26 illustrate the ability to search through the users existing smart bookmarks as well as add new smart bookmarks relating to the search query.

Figure 27:
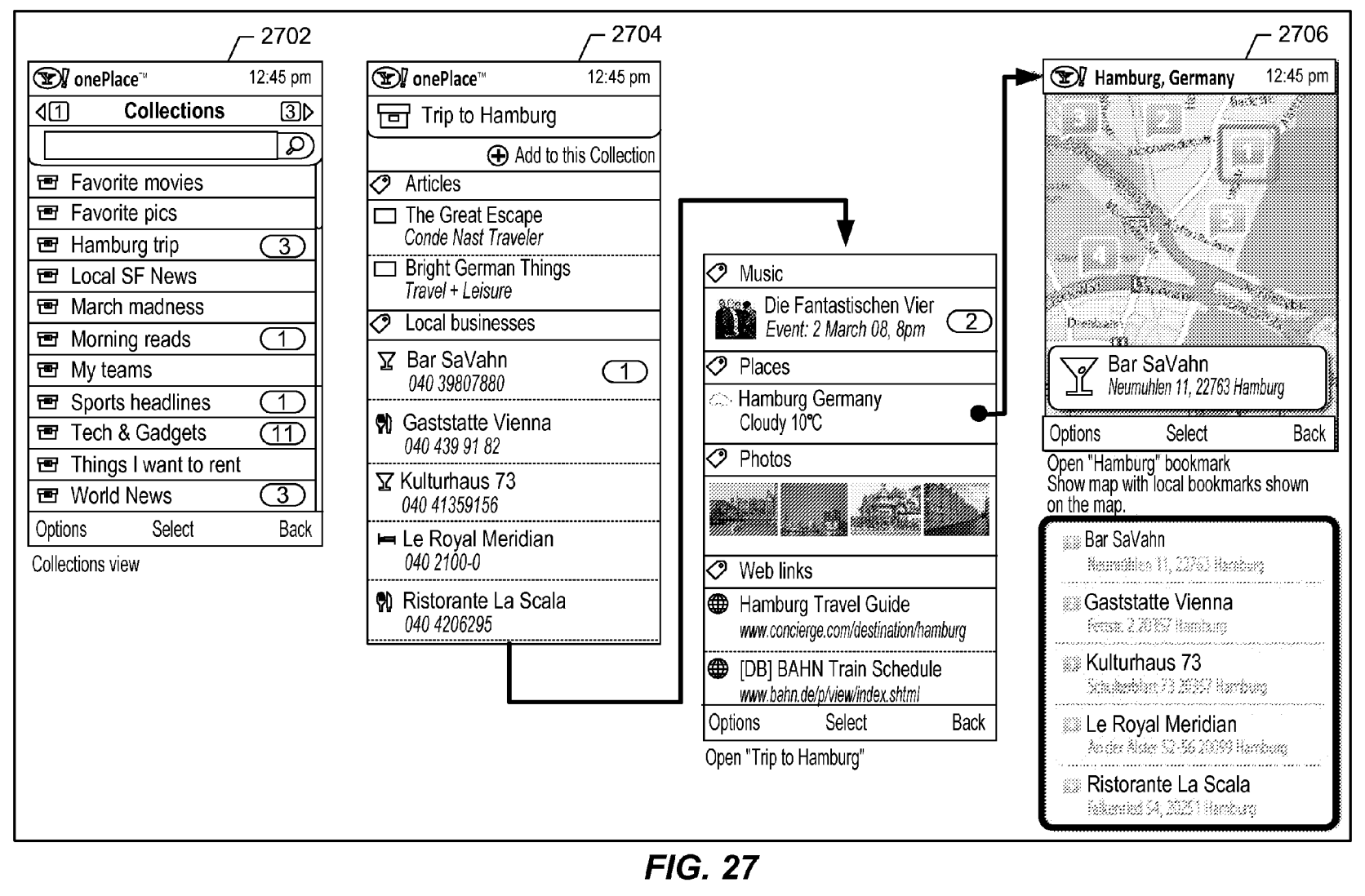
Figure 32:

Screenshots 2702-2706 of FIG. 27 provide another example of the various views associated with a collection of smart bookmarks (i.e., Hamburg Trip) from the top level Collections view, and then drilling down to more specific views. Screenshots 2802-2806, 2902-2904, 3002-3006, and 3102-3104 of FIGS. 28-31 illustrate various views of smart bookmarks by "Categories" such as Movies, Stocks, Sports, and News. Screenshot 3102 of FIG. 31 and the screen shot 3202 of FIG. 32 illustrate a particular example of a drill down into the collection "Tech & Gadgets."

Figure 33:
Figure 34:
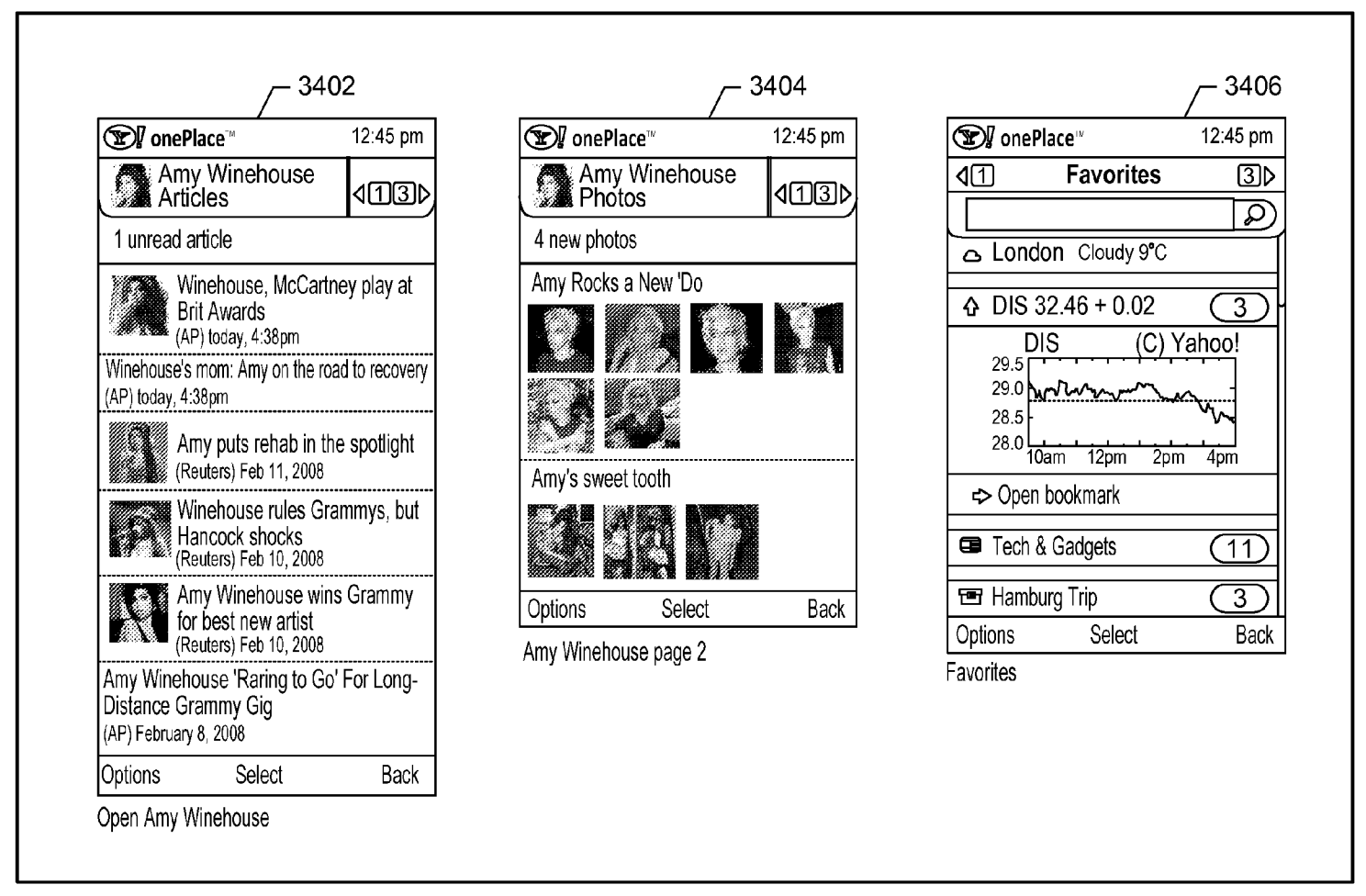

Screenshot 3302 of FIG. 33 provides another example of a "Pulse" view in which recent updates for the user's smart bookmarks are presented. Screenshots 3402 and 3404 of FIG. 34 illustrate a drill down from the Pulse view into views of different result types (i.e., articles and photos) for a particular entity in the Pulse view. Screenshot 3406 illustrates organization of a user's smart bookmarks according to "Favorites."

Figure 35:
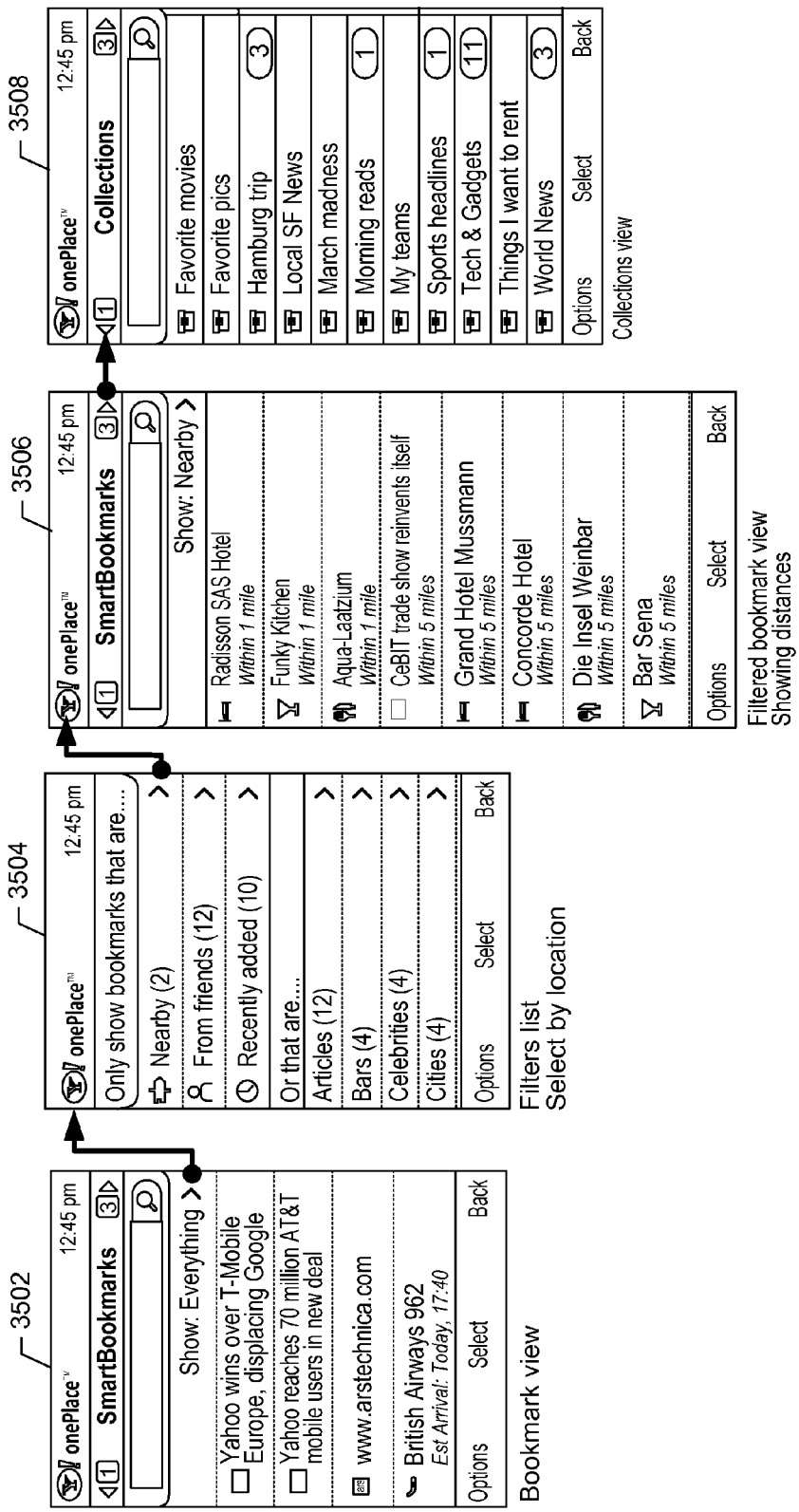
Figure 36:
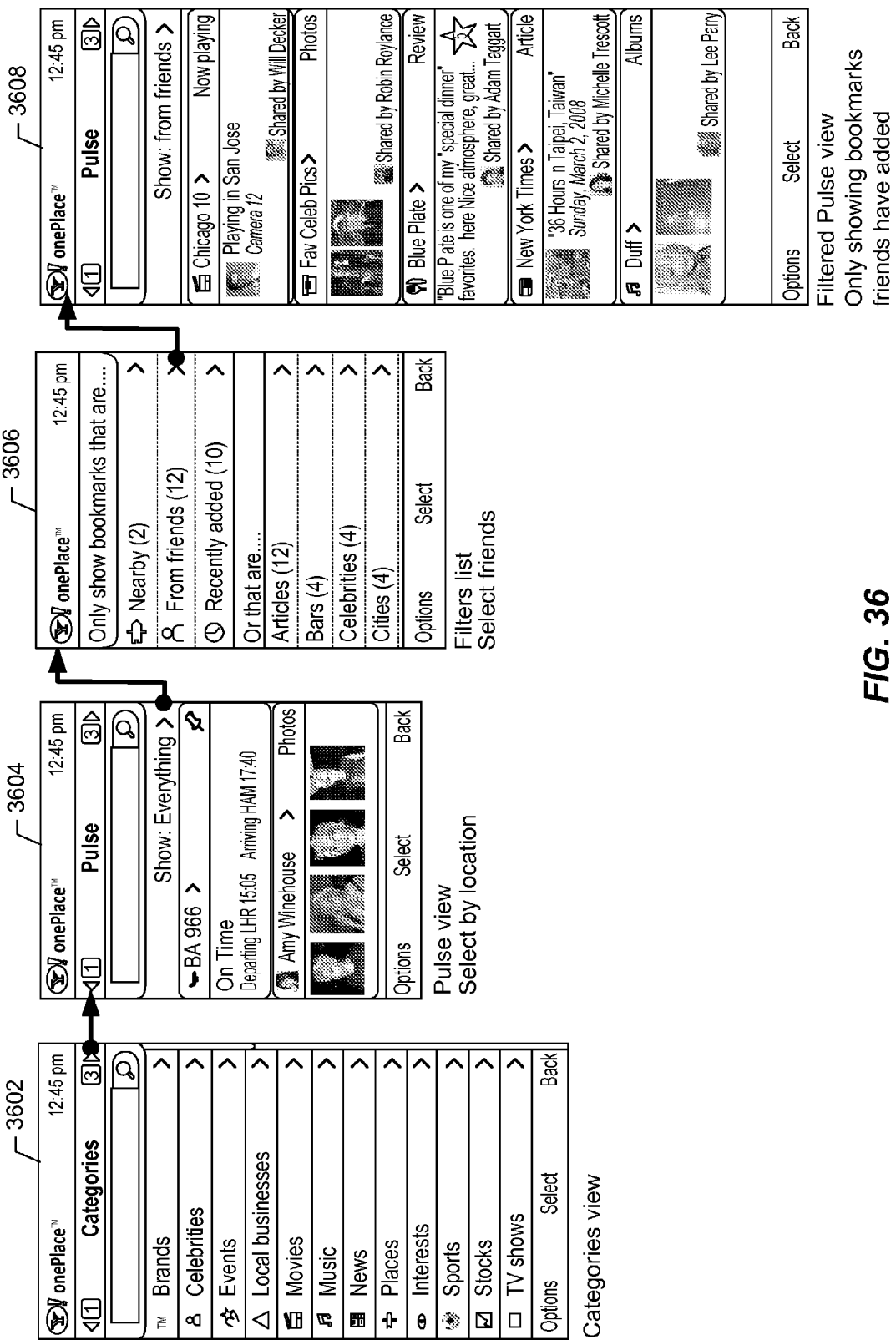

The screenshots of FIGS. 35 and 36 illustrate an example of a flow in which the user navigates between various views, starting with a view of all of his smart bookmarks, then filtering the view by spatial information, i.e., geographically relevant smart bookmarks (screenshots 3502-3506). The views then switch through the Collections view (3508), the Categories view (3602), and the Pulse view (3604) in succession. The Pulse view is then filtered to include updates for smart bookmarks which are socially relevant, i.e., "From friends," (3606 and 3608).

According to various embodiments, onePlace smart bookmarks enable the user to "bookmark the world." That is, with the knowledge of W4 metadata, a user can actually bookmark real world entities (as opposed to only digital objects) including, for example, people and places. So, for example, if the user is at Yankee Stadium, his location in space can be fairly precisely determined from his mobile device, e.g., his cell phone, and the fact that the location is Yankee Stadium can be readily determined with reference to any online map database. Therefore, the user can simply bookmark his current location which will then show up in his smart bookmarks as the entity Yankee Stadium which, in turn, maps to other entities (e.g., the New York Yankees), as well as a variety of result types (e.g., maps, photos, web sites, news, people, etc.).

And according to various specific implementations, onePlace smart bookmarks allow a user to get live feeds for that entity from multiple and different types of sources, to share those smart bookmarks with others, and/or to have the results rendered in a manner which takes into account W4 metadata and/or social relationship data.

According to various embodiments of the invention, additional functionalities are contemplated which leverage the nature of onePlace smart bookmarks. According to one class of embodiments, the user is given explicit control over result type renderers to create custom presentations or playlists of content relating to entities of interest. For example, a user may be given the option of selecting some subset of his smart bookmarks and requesting that any video streams associated with the entities corresponding to the selected smart bookmarks be streamed in a successive manner, thereby creating a custom video channel which includes content relating to the entities in which the user has an interest. News stories relating to some subset of the user's smart bookmarks could be similarly aggregated and presented. More generally, the user will be able to combine any type of result type content for any entit(ies) into such a playlist and view that result type content in an associated player for the result type. And it should be understood that, while the order in which such content is presented can also be explicitly controlled by the user, it can also be automatically controlled or biased using any of the techniques described herein.

Embodiments of the present invention may be employed to aggregate content in any of a wide variety of computing contexts. For example, as illustrated in the network diagram of FIG. 37, implementations are contemplated in which the relevant population of users interacts with a diverse network environment via any type of computer (e.g., desktop, laptop, tablet, etc.) 3702, media computing platforms 3703 (e.g., cable and satellite set top boxes and digital video recorders), mobile computing devices (e.g., PDAs) 3704, cell phones 3706, or any other type of computing or communication platform.

And according to various embodiments, user data processed in accordance with the invention may be collected using a wide variety of techniques. For example, collection of data representing a user's interaction with a web site or web-based application or service (e.g., the number of page views) may be accomplished using any of a variety of well known mechanisms for recording a user's online behavior. User data may be mined directly or indirectly, or inferred from data sets associated with any network or communication system on the Internet. And notwithstanding these examples, it should be understood that such methods of data collection are merely exemplary and that user data may be collected in many ways.

Figure 37:
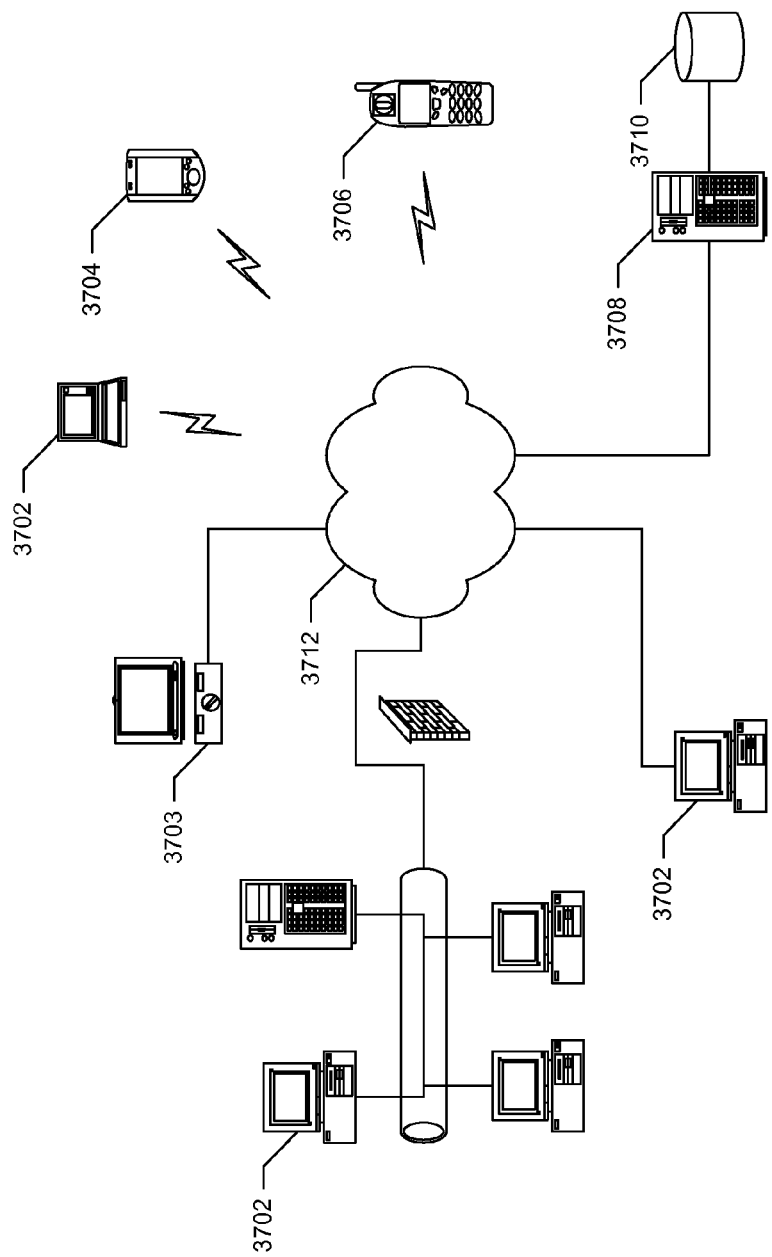
FIG. 37 is a simplified diagram of a computing environment in which embodiments of the present invention may be implemented.

Once collected, the user data may be processed in some centralized manner. This is represented in FIG. 37 by server 3708 and data store 3710 which, as will be understood, may correspond to multiple distributed devices and data stores. The invention may also be practiced in a wide variety of network environments including, for example, TCP/IP-based networks, telecommunications networks, wireless networks, etc. These networks, as well as the various social networking sites and communication systems from which connection data may be aggregated according to the invention are represented by network 3712.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects.

What is claimed is:

1. A computer-implemented method for providing access to content, comprising facilitating presentation of a smart bookmark in a user interface, the smart bookmark comprising a graphical user interface that simultaneously presents a plurality of dynamic entries relating to a particular concept, each dynamic entry conveying current information regarding the particular concept and comprising one or more objects representing remotely stored content relating to the particular concept, the one or more objects for each dynamic entry being configured to facilitate access to the corresponding remotely stored content and to automatically update the current information conveyed by the dynamic entry in response to events relating to the particular concept, one or more of the dynamic entries relating to contextual metadata associated with a user associated with the user interface, wherein the remotely stored content represented by the objects associated with the plurality of dynamic entries originates from a plurality of different sources, the smart bookmark thus enabling aggregation of and dynamic access to the remotely stored content relating to the particular concept from the plurality of different sources.

2. The method of claim 1 wherein the contextual metadata represents one or more of user information associated with the user, a social relationship associated with the user, a current geographic location associated with the user, a current time associated with the user, or a current topic.

3. The method of claim 1 further comprising updating a first one of the plurality of dynamic entries substantially in real time to reflect a corresponding change to one or more of the current information associated with the first dynamic entry, or the remotely stored content represented by the object associated with the first dynamic entry.

4. The method of claim 1 wherein the plurality of dynamic entries are ordered with reference to the contextual metadata.

5. The method of claim 1 wherein the contextual metadata represents a social relationship associated with the user, and wherein a first one of the plurality of dynamic entries includes vitality corresponding to the social relationship.

6. The method of claim 1 wherein the contextual metadata represents a group to which the user belongs, and wherein a first one of the plurality of dynamic entries refers to other members of the group.

7. The method of claim 6 wherein the user does not have an existing social connection with at least one of the other members of the group to which the first dynamic entry refers.

8. The method of claim 1 wherein the contextual metadata represents a first geographic location associated with the user, and wherein a first one of the plurality of dynamic entries identifies a second geographic location in proximity to the first geographic location and relevant to the particular concept to which the dynamic entries of the smart bookmark relate.

9. The method of claim 1 wherein the contextual metadata represents a current time associated with the user, and wherein a first one of the plurality of dynamic entries identifies an event relevant to the current time and the particular concept to which the dynamic entries of the smart bookmark relate.

10. The method of claim 1 wherein selected ones of the plurality of dynamic entries include one or more of sponsorship indicia, a link to a shopping opportunity, an advertisement, or a market research mechanism.

11. The method of claim 1 wherein the contextual metadata represents a current geographic location of the user, the method further comprising facilitating creation of the smart bookmark by the user at the current geographic location, wherein the particular concept corresponds to the current geographic location, thereby enabling the user to bookmark a real-world location.

12. The method of claim 1 wherein the contextual metadata represents a social relationship associated with the user, the method further comprising disseminating smart bookmark configuration information configured to enable instantiation of the smart bookmark, the disseminating being done with reference to the social relationship to enable use of an instance of the smart bookmark by another user.

13. At least one computer-readable medium having data structures stored therein comprising smart bookmark configuration information, the smart bookmark configuration information being configured to enable instantiation of a smart bookmark, the smart bookmark comprising a graphical user interface that simultaneously presents a plurality of dynamic entries relating to a particular concept, each dynamic entry conveying current information regarding the particular concept and comprising one or more objects representing remotely stored content relating to the particular concept, the one or more objects for each dynamic entry being configured to facilitate access to the corresponding remotely stored content and to automatically update the current information conveyed by the dynamic entry in response to events relating to the particular concept, one or more of the dynamic entries relating to contextual metadata associated with a user associated with the user interface, wherein the remotely stored content represented by the objects associated with the plurality of dynamic entries originates from a plurality of different sources, the smart bookmark thus enabling aggregation of and dynamic access to the remotely stored content relating to the particular concept from the plurality of different sources.

* * * * *